United States Patent
Sloo et al.

(10) Patent No.: US 9,835,434 B1
(45) Date of Patent: Dec. 5, 2017

(54) HOME AUTOMATION INPUT INTERFACES BASED ON A CAPACITIVE TOUCHSCREEN FOR DETECTING PATTERNS OF CONDUCTIVE INK

(71) Applicant: Google Inc., Mountain View, CA (US)

(72) Inventors: David Sloo, Menlo Park, CA (US); Shigefumi Honjo, Santa Cruz, CA (US); Anthony M. Fadell, Woodside, CA (US)

(73) Assignee: GOOGLE INC., Mountain View, CA (US)

( * ) Notice: Subject to any disclaimer, the term of this patent is extended or adjusted under 35 U.S.C. 154(b) by 290 days.

(21) Appl. No.: 14/513,152

(22) Filed: Oct. 13, 2014

(51) Int. Cl.
  *G06K 19/06* (2006.01)
  *G01B 7/02* (2006.01)

(52) U.S. Cl.
  CPC ..................... *G01B 7/02* (2013.01)

(58) Field of Classification Search
  CPC ...... G06K 19/067; G06K 7/081; G06K 7/085; G06K 19/06028; G06K 7/087; G06K 9/186; G06K 9/209; A63F 3/0665; G07F 7/086; A61B 2560/0209
  USPC ......................................................... 235/494
  See application file for complete search history.

(56) References Cited

U.S. PATENT DOCUMENTS

| | | | | |
|---|---|---|---|---|
| 5,159,181 A | * | 10/1992 | Bartels | G06K 1/126 235/441 |
| 5,337,043 A | | 8/1994 | Gokcebay | |
| 6,053,405 A | * | 4/2000 | Irwin, Jr. | A63F 3/0665 235/375 |
| 6,168,080 B1 | * | 1/2001 | Verschuur | B07C 1/00 235/451 |
| 6,202,929 B1 | * | 3/2001 | Verschuur | G06K 7/081 235/449 |
| 6,875,105 B1 | * | 4/2005 | Behm | A63F 3/0665 235/375 |
| 7,130,719 B2 | | 10/2006 | Ehlers et al. | |
| 2001/0020935 A1 | * | 9/2001 | Gelbman | G06F 3/147 345/173 |

(Continued)

OTHER PUBLICATIONS

Authentication, wikipedia, accessed online Oct. 15, 2015 10 pgs, http://en.wikipedia.org/wiki/Authentication.

(Continued)

*Primary Examiner* — Thien M Le
(74) *Attorney, Agent, or Firm* — Morgan, Lewis & Bockius LLP

(57) ABSTRACT

An electronic device with a two-dimensional capacitance sensing area, a camera, one or more processors and memory detects a predefined capacitance distribution of an object that is placed on or near the two-dimensional capacitance sensing area. The object includes a predefined visual pattern on the object. The device, in response to detecting the predefined capacitance distribution of the object that is placed on or near the two-dimensional capacitance sensing area, performs a first predefined operation in accordance with first information encoded by the predefined capacitance distribution of the object. The device detects the predefined visual pattern on the object using the camera, and performs the first predefined operation in accordance with second information encoded in the predefined visual pattern detected using the camera.

20 Claims, 18 Drawing Sheets

(56) References Cited

U.S. PATENT DOCUMENTS

| | | | |
|---|---|---|---|
| 2002/0041372 A1* | 4/2002 | Gardner | B41M 3/144 356/71 |
| 2002/0188663 A1 | 12/2002 | Islam et al. | |
| 2005/0006472 A1 | 1/2005 | Verschuur et al. | |
| 2006/0084462 A1 | 4/2006 | Panje | |
| 2006/0279038 A1* | 12/2006 | Irwin | A63F 3/0665 273/138.1 |
| 2007/0057311 A1* | 3/2007 | Leenders | B82Y 10/00 257/315 |
| 2007/0260572 A1* | 11/2007 | Boucard | G06F 17/30876 |
| 2010/0149119 A1 | 6/2010 | Homma et al. | |
| 2010/0321151 A1 | 12/2010 | Matsuura et al. | |
| 2011/0062237 A1 | 3/2011 | Chaves | |
| 2011/0233273 A1 | 9/2011 | Meyerhofer et al. | |
| 2013/0076507 A1 | 3/2013 | Petricoin, Jr. | |
| 2013/0159396 A1 | 6/2013 | Newman | |
| 2013/0161387 A1* | 6/2013 | King | B41F 33/00 235/431 |
| 2013/0194192 A1 | 8/2013 | Andolina | |
| 2013/0225072 A1 | 8/2013 | Fuller et al. | |
| 2014/0089671 A1 | 3/2014 | Logue et al. | |

OTHER PUBLICATIONS

Bilton, TouchBase: An NFC alternative that you might actually use, Jul. 29, 2013, 5 pgs, http://venturebeat.com/2013/07/29/touchbase-nfc-alternative/.

Conductive ink, wikipedia, accessed online Oct. 15, 2015, 2 pgs, http://en.wikipedia.org/wiki/Conductive_ink.

Erickson, U.S. Appl. No. 13/926,335, Jun. 25, 2013, 155 pgs.

Fance, TouchBase: Tap and Go Business Cards, accessed online Oct. 15, 2015, 6 pgs, http://www.lifehack.org/articles/technology/touchbase-tap-and-business-cards.html.

Hiscott, High-Tech Business Cards Digitize Contact Info With a Tap, Feb. 10, 2014, 8 pgs, http://mashable.com/2014/02/10/touchbase-business-cards/.

Horsey, TouchBase Business Cards Interact With Your Touchscreen Smartphone, Feb. 5, 2014, 4 pgs, http://www.geeky-gadgets.com/touchbase-business-cards-interact-with-your-touchscreen-smartphone-video-05-02-2014/.

Kirsner, TouchBase tries (one more time) to reinvent the business card, Feb. 4, 2014, 1 pg, http://www.boston.com/business/technology/innoeco/2014/02/touchbase_tries_one_more_time.html.

Kornacki, Digging Deeper Into Nest Security, Jan. 29, 2014, 7 pgs, http://www.symantec.com/connect/blogs/digging-deeper-nest-security.

Liszewski, Your Smartphone's Touchscreen Can Read These Magical Business Cards, Feb. 4, 2014, 9 pgs, http://gizmodo.com/your-smartphones-touchscreen-can-read-these-magical-bu-1515779391.

Multi-factor authentication, wikipedia, accessed online Oct. 15, 2015, 5 pgs, http://en.wikipedia.org/wikiiMulti-factor_authentication.

TouchBase Technologies, AngelList, accessed online Oct. 15, 2015, 3 pgs, https://angel.co/touchbase-technologies.

* cited by examiner

820 In response to detecting the predefined capacitance distribution of the object that is placed on or near the two-dimensional capacitance sensing area, initiate sending information for configuring a smart home controller such that the smart home controller changes from operating in a first configuration to operating in a second configuration, distinct from the first configuration, based on the sent information 822 In response to detecting the predefined capacitance distribution of the object that is placed on or near the two-dimensional capacitance sensing area, initiate pairing of the electronic device with the smart home controller 824 The sent information comprises one or more of: raw data from the two-dimensional capacitance sensing area and specific instructions derived from the raw data 826 The first configuration is for a security mode of the smart home controller 828 The second configuration is for a guest mode of the smart home controller 830 Inputs received from users while in the second configuration are prevented from adjusting operation of the smart home controller in other configurations besides the second configuration 832 While operating in the first configuration, the smart home controller executes one or more learning algorithms, and while operating in the second configuration, the smart home controller is prevented from executing the one or more learning algorithms 834 (see Figure 8C)

FIGURE 8B

820 In response to detecting the predefined capacitance distribution of the object that is placed on or near the two-dimensional capacitance sensing area, initiate sending information for configuring a smart home controller such that the smart home controller changes from operating in a first configuration to operating in a second configuration, distinct from the first configuration, based on the sent information 834 At the electronic device: compare the detected predefined capacitance distribution to a plurality of pre-stored capacitance distributions each associated with a smart home configuration; determine whether the detected predefined capacitance distribution matches one of the plurality of pre-stored capacitance distributions; and, in accordance with a determination that the detected predefined capacitance distribution matches one of the plurality of pre-stored capacitance distributions, initiate sending an instruction to the smart home controller to operate in a configuration associated with the detected predefined capacitance distribution 836 Send raw data from the electronic device to a second electronic device in wireless communication with the electronic device, the raw data including the predefined capacitance distribution detected by the two-dimensional capacitance sensing area of the electronic device, wherein the second electronic device: compares the detected predefined capacitance distribution to a plurality of pre-stored capacitance distributions each associated with a smart home configuration; determines whether the detected predefined capacitance distribution matches one of the plurality of pre-stored capacitance distributions; and, in accordance with a determination that the detected predefined capacitance distribution matches one of the plurality of pre-stored capacitance distributions, sends an instruction to the smart home controller to operate in a configuration associated with the detected predefined capacitance distribution

902 Receive information from an electronic device with a two-dimensional capacitance sensing area. The received information is based on a predefined capacitance distribution detected for an object placed on or near the two-dimensional capacitance sensing area.

904 The electronic device is a portable phone, a portable tablet, or a portable wearable electronic device with a capacitive touch-sensitive surface

906 The electronic device is a control panel coupled with the smart home controller

908 The predefined capacitance distribution of the object is provided by conductive ink printed on the object

910 The object also includes a one-dimensional barcode or a two-dimensional barcode

912 The conductive ink is printed as at least part of a one-dimensional barcode or a two-dimensional barcode on the object

914 The received information includes one or more of: raw data from the two-dimensional capacitance sensing area of the electronic device and specific instructions derived from the raw data

916 In response to receiving the information from the electronic device with the two-dimensional capacitance sensing area, at least conditionally configuring the smart home controller, such that the smart home controller changes from operating in a first configuration to operating in a second configuration, distinct from the first configuration, based on the received information 918 At least conditionally configuring the smart home controller includes: comparing the received information to a plurality of pre-stored capacitance distributions each associated with a smart home configuration; determining whether the detected predefined capacitance distribution matches one of the plurality of pre-stored capacitance distributions; and, in accordance with a determination that the detected predefined capacitance distribution matches one of the plurality of pre-stored capacitance distributions, changing an operating configuration of the smart home controller to a configuration associated with the predefined capacitance distribution 920 The first configuration is for a security mode of the smart home controller 922 The second configuration is for a guest mode of the smart home controller 924 Prevent inputs received from users while in the second configuration from adjusting operation of the smart home controller in other configurations besides the second configuration 926 While operating in the first configuration, execute one or more learning algorithms. While operating in the second configuration, forego executing the one or more learning algorithms.

HOME AUTOMATION INPUT INTERFACES BASED ON A CAPACITIVE TOUCHSCREEN FOR DETECTING PATTERNS OF CONDUCTIVE INK

TECHNICAL FIELD

This relates generally to detecting patterns of conductive ink, including but not limited to detecting patterns of conductive ink using a capacitance sensor.

BACKGROUND

Barcodes are used widely in various settings. For example, many items sold at retail stores are labeled with barcodes. Each barcode encodes information that uniquely identifies the labeled item. In retail stores, the use of barcodes has eliminated the need for manually looking up identifying information and price of each item at cash registers, thereby significantly improving the checkout process.

But conventional barcodes represented by visible patterns require optical scanners to read the barcodes. Reading conventional barcodes with a portable electronic device (e.g., a mobile phone or a tablet) requires launching a camera application, placing a barcode at an appropriate distance in front of a camera of the portable electronic device, waiting for the camera to focus on the barcode, and taking a photograph of the barcode, which is time-consuming, cumbersome and inefficient.

SUMMARY

Accordingly, there is a need for more efficient methods and devices for encoding information and conveying encoded information. Such methods and devices optionally complement or replace conventional barcodes. In particular, such methods and devices are useful for configuring a smart home controller.

In accordance with some embodiments, a method is performed at an electronic device with a two-dimensional capacitance sensing area, one or more processors and memory. The method includes: monitoring the two-dimensional capacitance sensing area for changes in capacitance at a plurality of different locations of the two-dimensional capacitance sensing area; detecting a predefined capacitance distribution of an object that is placed on or near the monitored two-dimensional capacitance sensing area; and, in response to detecting the predefined capacitance distribution of the object that is placed on or near the two-dimensional capacitance sensing area, initiating sending information for configuring a smart home controller such that the smart home controller changes from operating in a first configuration to operating in a second configuration, distinct from the first configuration, based on the sent information.

In accordance with some embodiments, an electronic device includes a two-dimensional capacitance sensing area, one or more processors, and memory storing one or more programs configured to be executed by the one or more processors. The one or more programs include instructions for performing the operations of the method described above. In accordance with some embodiments, a computer readable storage medium has stored therein instructions, which, when executed by an electronic device with a two-dimensional capacitance sensing area and one or more processors, cause the device to perform the operations of the method described above. In accordance with some embodiments, an electronic device includes a two-dimensional capacitance sensing area and means for performing the operations of the method described above.

Thus, electronic devices with two-dimensional capacitance sensing areas are provided with faster, more efficient methods and interfaces for configuring a smart home controller, thereby increasing the effectiveness, efficiency, and user satisfaction with such devices. Such methods and interfaces may complement or replace conventional methods for configuring a smart home controller.

In accordance with some embodiments, a method is performed at a smart home controller with one or more processors and memory. The method includes receiving information from an electronic device with a two-dimensional capacitance sensing area. The received information is based on a predefined capacitance distribution detected for an object placed on or near the two-dimensional capacitance sensing area. The method also includes, in response to receiving the information from the electronic device with the two-dimensional capacitance sensing area, at least conditionally configuring the smart home controller, such that the smart home controller changes from operating in a first configuration to operating in a second configuration, distinct from the first configuration, based on the received information.

In accordance with some embodiments, a smart home controller includes one or more processors and memory storing one or more programs. The one or more programs are configured to be executed by the one or more processors and the one or more programs include instructions for performing the operations of the method described above. In accordance with some embodiments, a computer readable storage medium has stored therein instructions, which, when executed by a smart home controller, cause the smart home controller to perform the operations of the method described above. In accordance with some embodiments, a smart home controller includes means for performing the operations of the method described above.

Thus, smart home controllers are provided with faster, more efficient methods for configuring the smart home controllers, thereby increasing the effectiveness, efficiency, and user satisfaction with such controllers. Such methods may complement or replace conventional methods for configuring the smart home controllers.

In accordance with some embodiments, a method is performed at an electronic device with a two-dimensional capacitance sensing area and a light-based sensor. The method includes detecting a predefined capacitance distribution of an object that is placed on or near the two-dimensional capacitance sensing area. The object includes a predefined visual pattern on the object. The method includes, in response to detecting the predefined capacitance distribution of the object that is placed on or near the two-dimensional capacitance sensing area, performing a first predefined operation in accordance with first information encoded by the predefined capacitance distribution of the object; detecting the predefined visual pattern on the object using the light-based sensor; and performing the first predefined operation in accordance with second information encoded in the predefined visual pattern detected using the light-based sensor.

In accordance with some embodiments, an electronic device includes a two-dimensional capacitance sensing area, a light-based sensor, one or more processors, and memory storing one or more programs. The one or more programs are configured to be executed by the one or more processors and the one or more programs include instructions for performing the operations of the method described above. In accordance with some embodiments, a computer readable storage medium has stored therein instructions, which, when executed by an electronic device with a two-dimensional capacitance sensing area and a light-based sensor, cause the device to perform the operations of the method described above. In accordance with some embodiments, an electronic device includes: a two-dimensional capacitance sensing area; a light-based sensor; and means for performing the operations of the method described above.

Thus, electronic devices with two-dimensional capacitance sensing areas and light-based sensors are provided with two alternative methods for performing predefined operations based on encoded information, thereby increasing the effectiveness, efficiency, and user satisfaction with such devices. Such methods may complement or replace conventional methods for performing predefined operations based on encoded information.

In accordance with some embodiments, an article of manufacture includes a substrate; a conductive material that is applied to the substrate and configured to provide a predefined capacitance distribution when the article is placed on or near a two-dimensional capacitance sensing area of an electronic device, the predefined capacitance distribution of the article encoding first information; and a predefined visual pattern that encodes second information.

Thus, articles of manufacture are provided with both conductive materials and predefined visual patterns for encoding information, thereby providing two alternative ways of conveying the encoded information. Such articles of manufacture may complement or replace conventional articles of manufacture for conveying encoded information.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8C are flow diagrams illustrating a method of sending information to configure a smart home controller using a predefined capacitance distribution detected at an electronic device in accordance with some embodiments.

FIGS. 9A-9B are flow diagrams illustrating a method of configuring a smart home controller in accordance with some embodiments.

DESCRIPTION OF EMBODIMENTS

Barcodes are useful in many applications. But conventional barcodes represented by visible patterns require optical scanners to read the barcodes. Reading conventional barcodes with a portable electronic device (e.g., a mobile phone or a tablet) requires launching a camera application, placing a barcode at an appropriate distance in front of a camera of the portable electronic device, waiting for the camera to focus on the barcode, and taking a photograph of the barcode, which is time-consuming, cumbersome and inefficient.

As described below, barcodes printed using conductive ink can be used instead of, or in addition to, optical barcodes. A capacitance distribution associated with a printed pattern of the conductive ink can be read by capacitive sensors, thereby eliminating the need for placing the barcode at an appropriate distance from a camera and waiting for the camera to focus on the barcode.

The printed pattern of the conductive ink is also useful in interacting with a smart home controller (e.g., activating appropriate security configurations), because the printed pattern of the conductive ink can provide additional information needed for operation of the smart home controller.

Furthermore, detecting the capacitance pattern of the conductive ink may complement detecting the visual pattern of optical barcodes. Users that prefer to simply place a barcode printed using conductive ink on a touch screen to detect the capacitance pattern may do so, while users that prefer to take a picture of the barcode may do so. In addition, a combination of a printed pattern of the conductive ink and an optical barcode offers a way for conveying information at a higher information density with higher reliability and better security.

Figure 5:
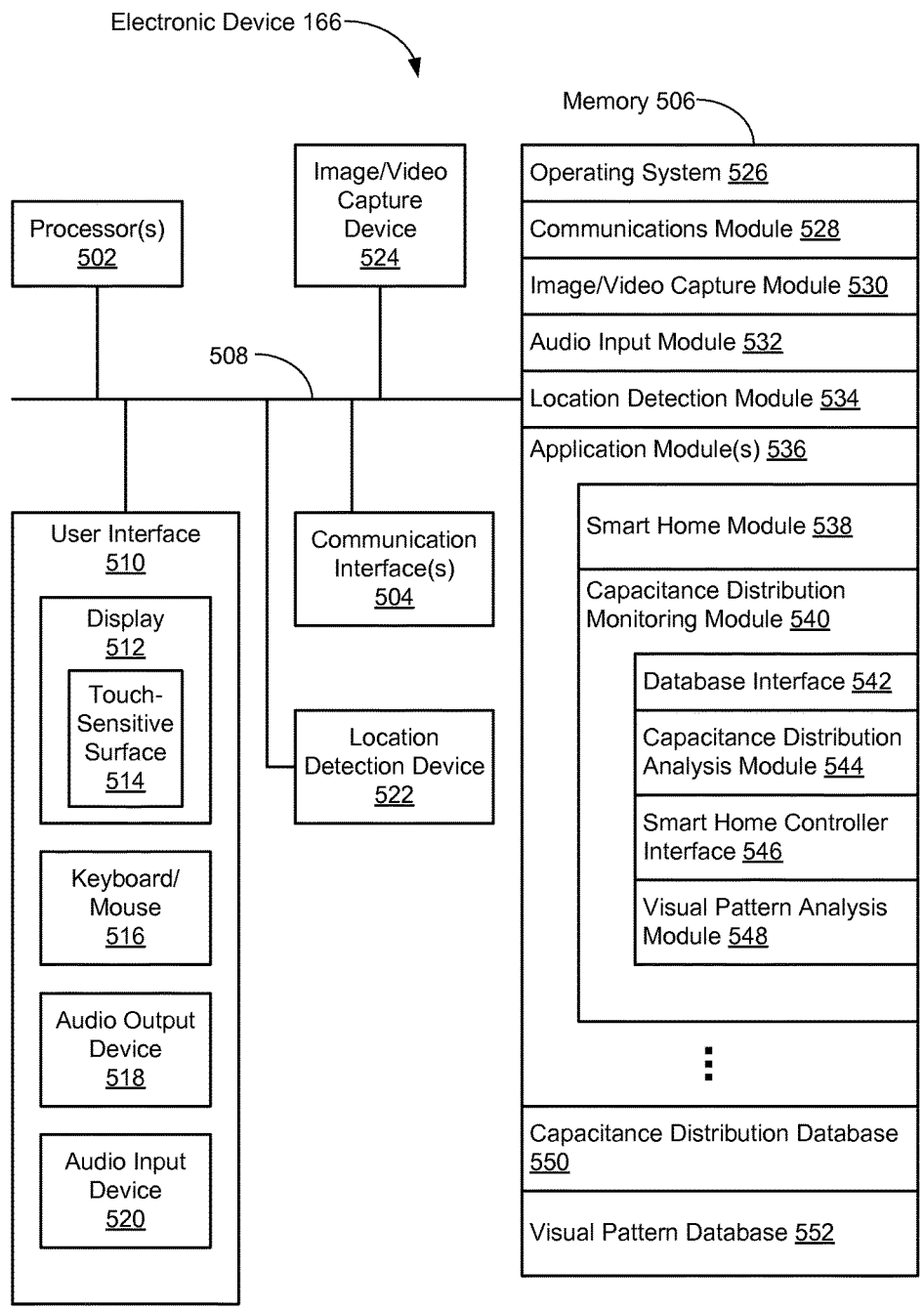
FIG. 5 is a block diagram illustrating an exemplary electronic device in accordance with some embodiments.
Figure 6:
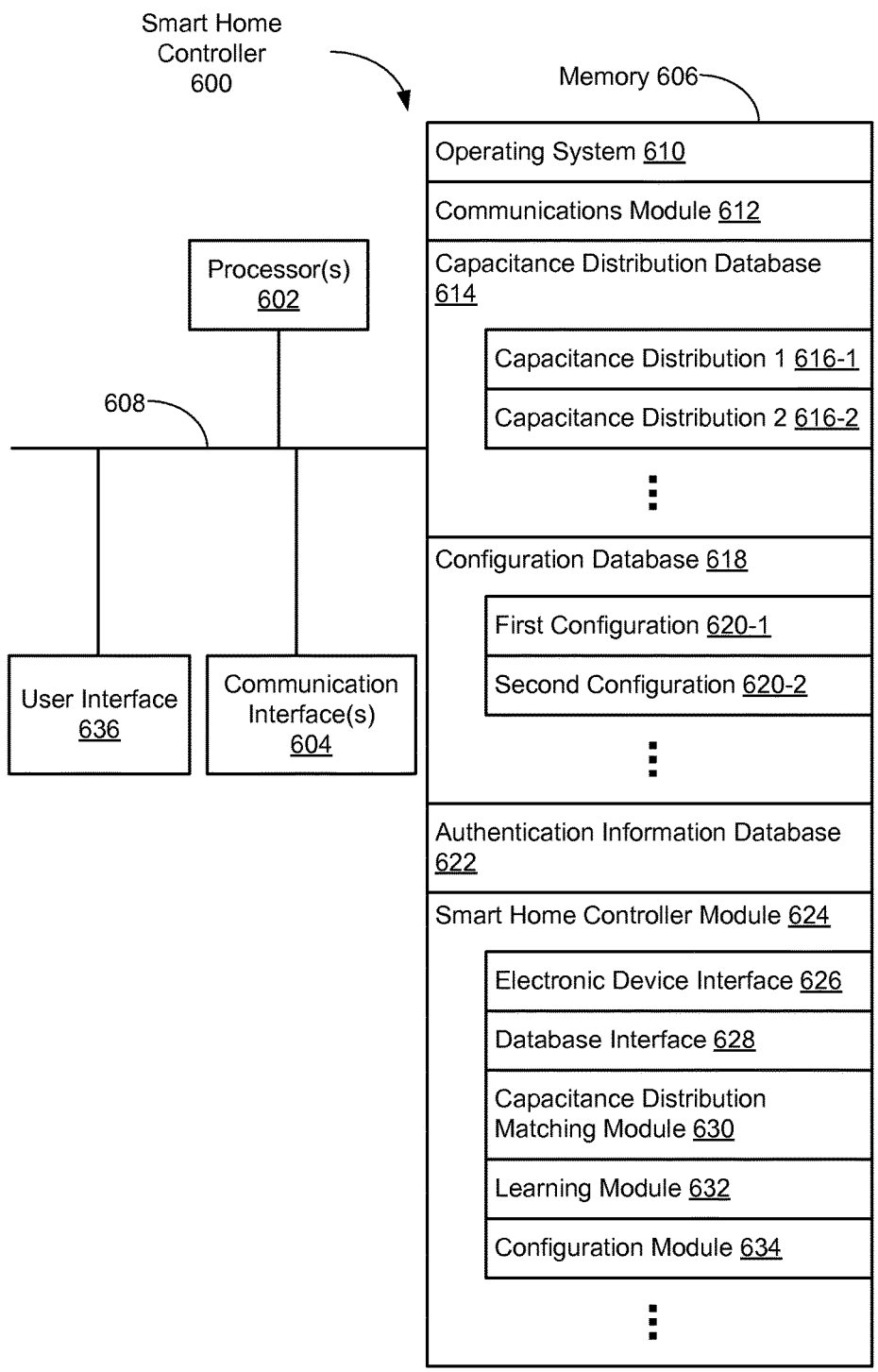
FIG. 6 is a block diagram illustrating an exemplary smart home controller in accordance with some embodiments.
Figure 7:
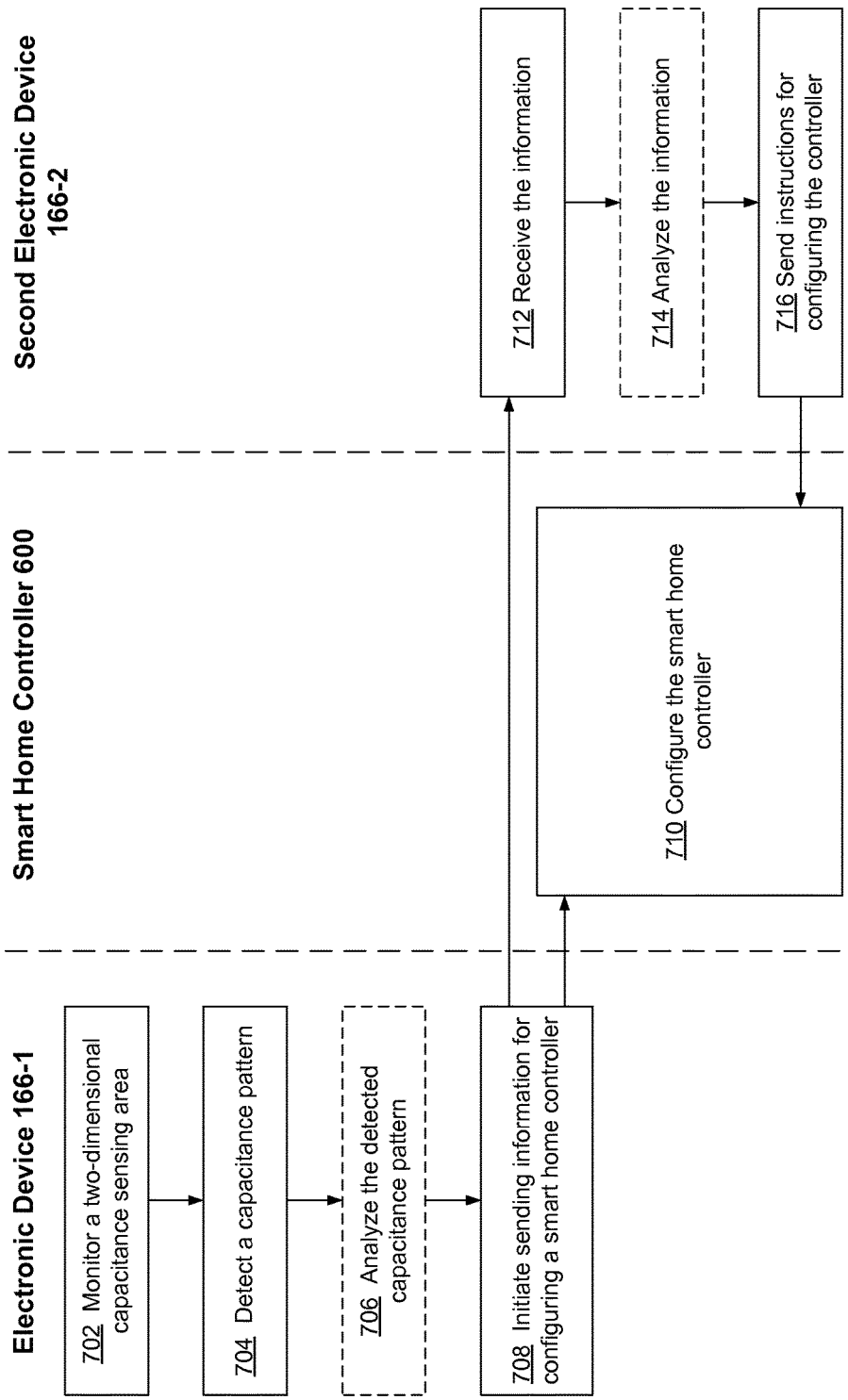
FIG. 7 is a flow diagram illustrating a method of configuring a smart home controller using a predefined capacitance distribution in accordance with some embodiments.
Figure 8A:
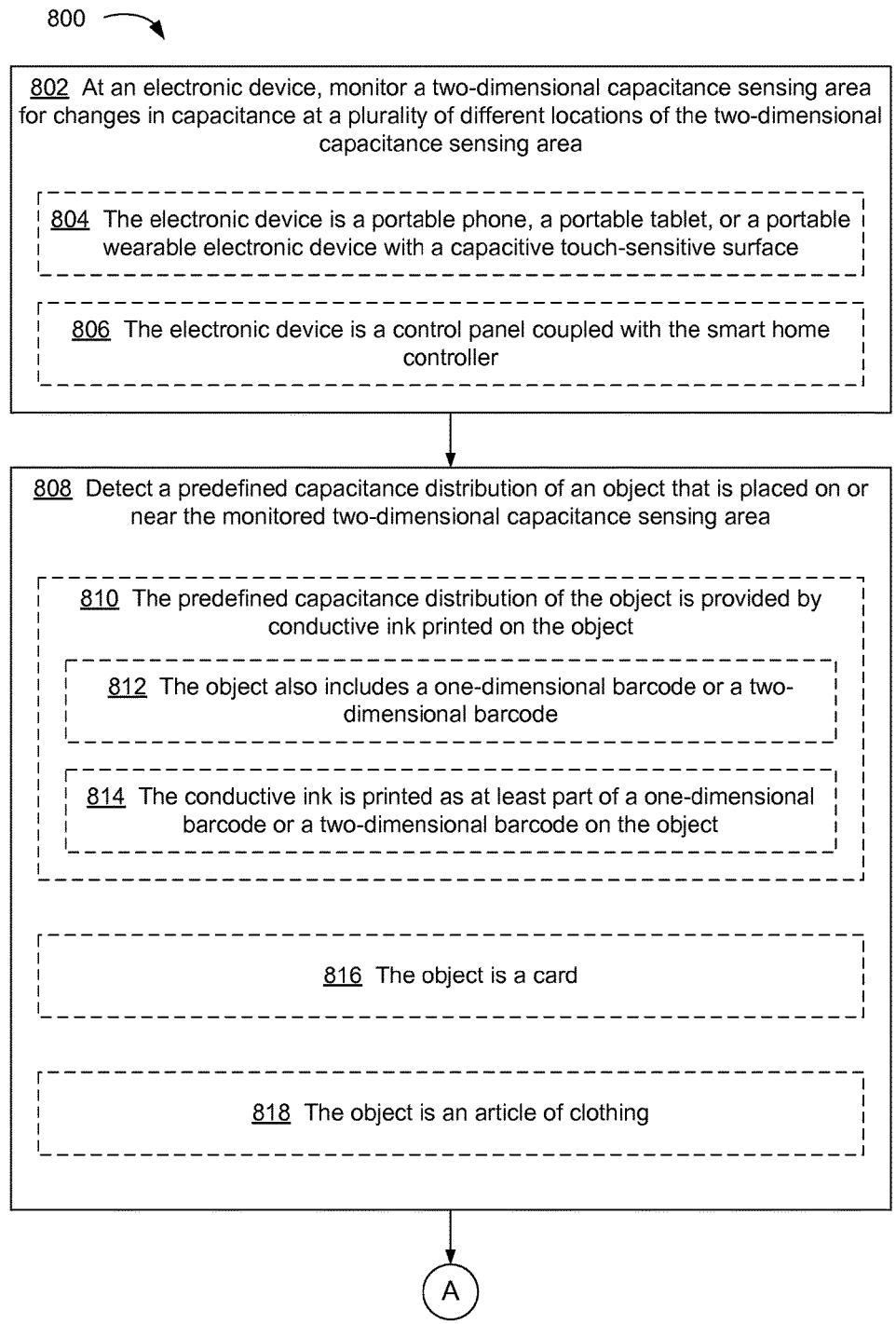

Below, FIGS. 1-4 provide an overview of exemplary smart home device networks and capabilities. FIG. 5 provides a description of an exemplary electronic device. FIG. 6 provides a description of an exemplary smart home controller. FIG. 7 is a flow diagram illustrating a method of changing a configuration of a smart home controller. FIGS. 8A-8C are flow diagrams illustrating a method, performed by an electronic device, of sending information to configure a smart home controller. FIGS. 9A-9B are flow diagrams illustrating a method of configuring a smart home controller. The diagrams in FIGS. 5-7 are used to illustrate the processes in FIGS. 8A-8C and 9A-9B. FIGS. 10A-10G describe exemplary barcodes. FIGS. 11A-11B are flow diagrams illustrating a method of performing a predefined operation based on either a printed pattern of the conductive ink or an optical barcode. The diagrams in FIGS. 10A-10G are used to illustrate the processes in FIGS. 11A-11B.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first configuration could be termed a second configuration, and, similarly, a second configuration could be termed a first configuration, without departing from the scope of the various described embodiments. The first configuration and the second configuration are both configurations, but they are not the same configuration.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments, such identity should not be construed in the descriptions that follow as necessarily limiting the scope of the present teachings to those particular individuals having those particular identities.

Figure 1:
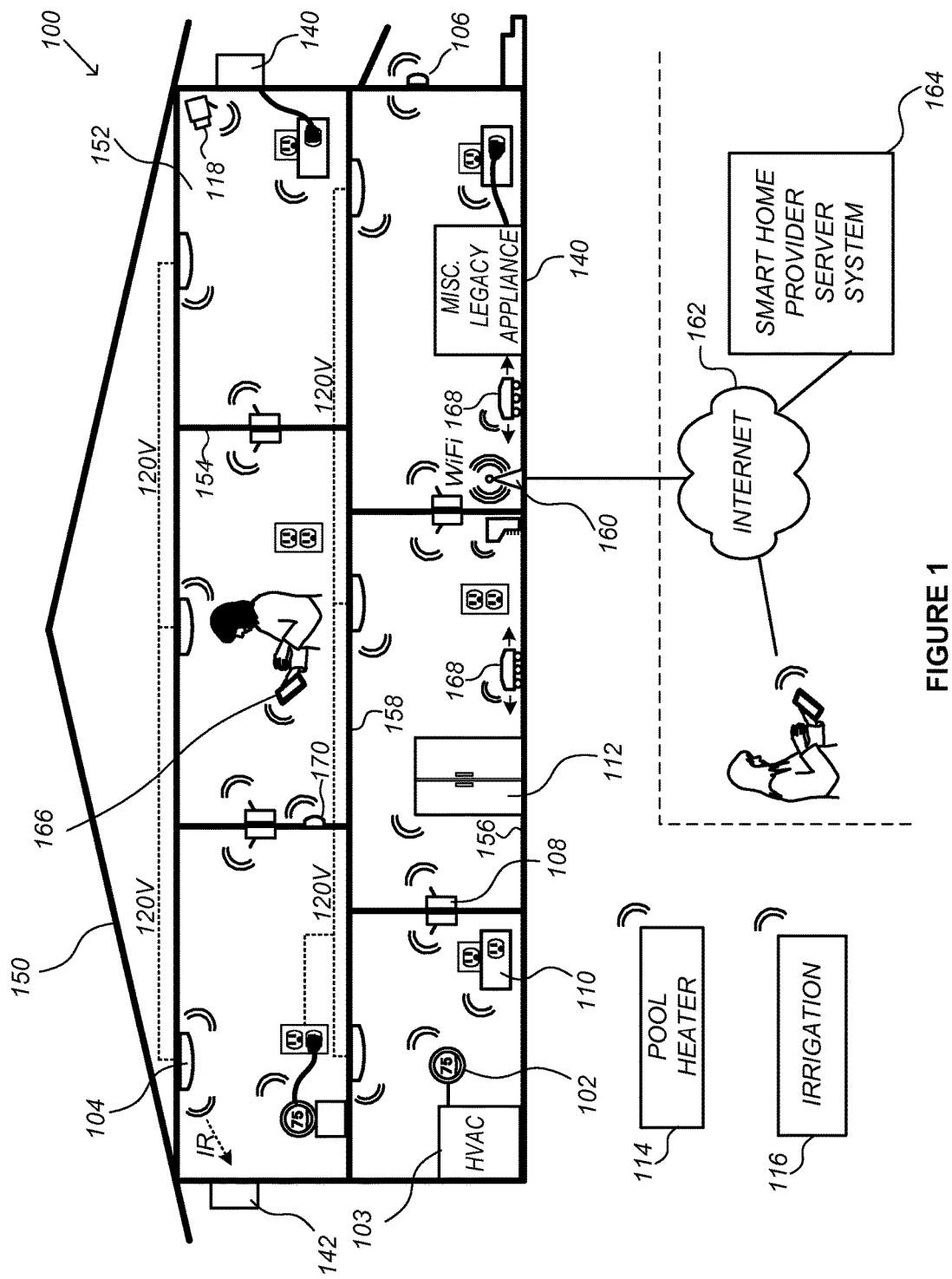
FIG. 1 is an exemplary smart home environment in accordance with some embodiments.

FIG. 1 is an exemplary smart home environment in accordance with some embodiments. Smart home environment 100 includes a structure 150, which is optionally a house, office building, garage, or mobile home. It will be appreciated that devices may also be integrated into a smart home environment 100 that does not include an entire structure 150, such as an apartment, condominium, or office space. Further, the smart home environment may control and/or be coupled to devices outside of the actual structure 150. Indeed, several devices in the smart home environment need not be physically within the structure 150. For example, a device controlling a pool heater 114 or irrigation system 116 may be located outside of structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some embodiments, the smart home environment 100 includes a plurality of devices, including intelligent, multi-sensing, network-connected devices, that integrate seamlessly with each other in a smart home network (e.g., 202, FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106"). In some embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, and/or carbon monoxide). The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some embodiments, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some embodiments, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some embodiments, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some embodiments, the smart home environment 100 includes one or more network-connected cameras 118 that are configured to provide video monitoring and security in the smart home environment 100.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other electronic device 166. In some embodiments, the electronic device 166 is a portable electronic device (e.g., a smartphone). A webpage or application may be configured to receive communications from the user and control the device based on the communications and/or to present information about the device's operation to the user. For example, the user may view a current set point temperature for a device and adjust it using a computer. The user may be in the structure during this remote communication or outside the structure.

As discussed above, users may control the smart thermostat and other smart devices in the smart home environment 100 using a network-connected computer or electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some embodiments, in addition to containing processing and sensing capabilities, devices 102, 104, 106, 108, 110, 112, 114, 116 and/or 118 (collectively referred to as "the smart devices") are capable of data communications and information sharing with other smart devices, a central server or cloud-computing system, and/or other devices that are network-connected. The required data communications may be carried out using any of a variety of custom or standard wireless protocols (IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (CAT6 Ethernet, HomePlug, etc.), or any other suitable communication protocol, including communication protocols not yet developed as of the filing date of this document.

In some embodiments, the smart devices serve as wireless or wired repeaters. In some embodiments, a first one of the smart devices communicates with a second one of the smart devices via a wireless router. The smart devices may further communicate with each other via a connection to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device. In some embodiments, a user is able to contact customer support using a smart device itself rather than needing to use other communication means, such as a telephone or Internet-connected computer. In some embodiments, software updates are automatically sent from the smart home provider server system 164 to smart devices (e.g., when available, when purchased, or at routine intervals).

Figure 2:
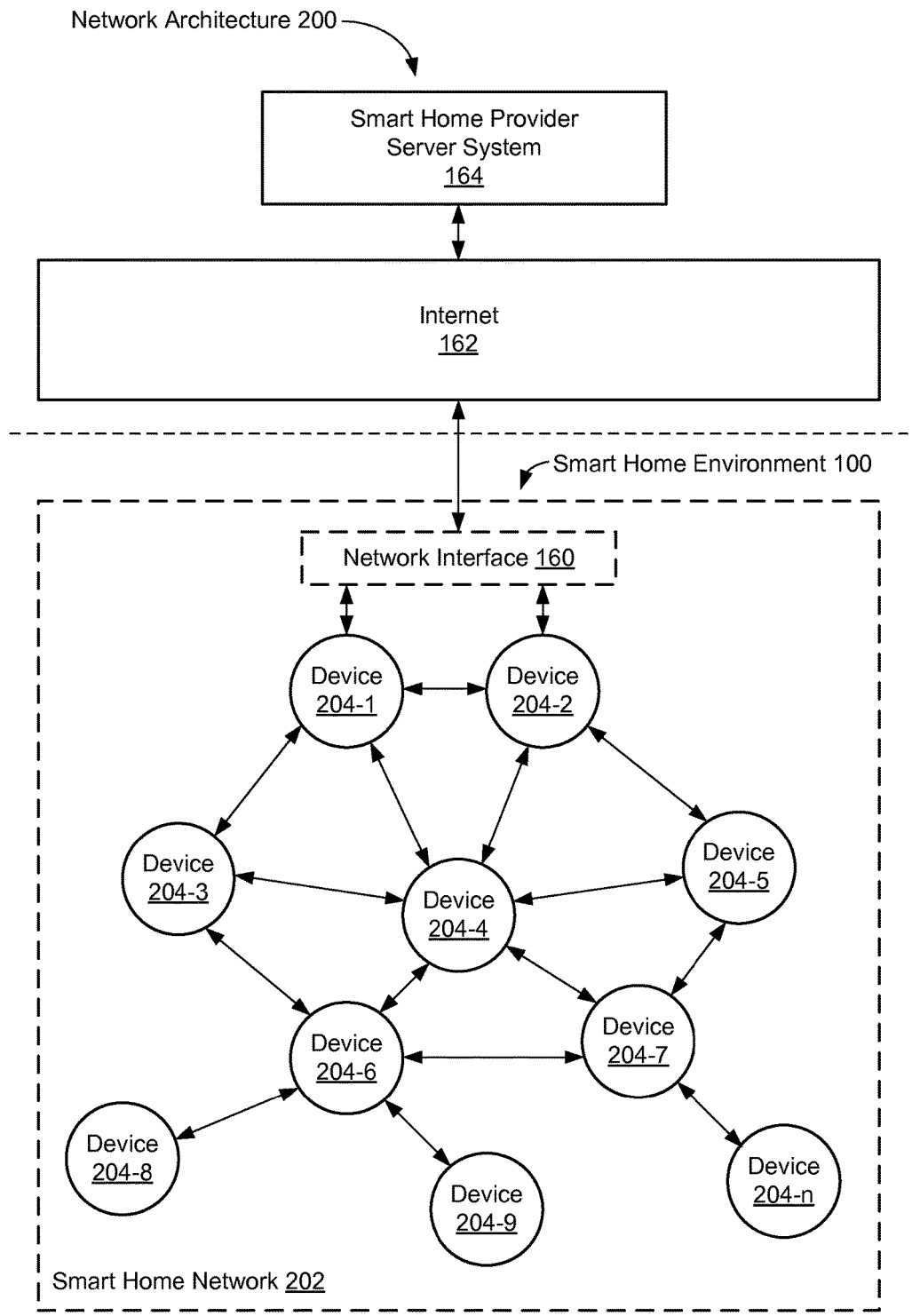
FIG. 2 is a block diagram illustrating an exemplary network architecture that includes a smart home network in accordance with some embodiments.

FIG. 2 is a block diagram illustrating an exemplary network architecture 200 that includes a smart home network 202 in accordance with some embodiments. In some embodiments, the smart devices 204 in the smart home environment 100 (e.g., devices 102, 104, 106, 108, 110, 112, 114, 116 and/or 118) combine to create a mesh network in smart home network 202. In some embodiments, one or more smart devices 204 in the smart home network 202 operate as a smart home controller. In some embodiments, a smart home controller has more computing power than other smart devices. In some embodiments, a smart home controller processes inputs (e.g., from smart devices 204, electronic device 166, and/or smart home provider server system 164) and sends commands (e.g., to smart devices 204 in the smart home network 202) to control operation of the smart home environment 100. In some embodiments, some of the smart devices in the mesh network are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some embodiments, one or more "spokesman" nodes operate as a smart home controller. On the other hand, the devices that are battery powered are referred to as "low-power" nodes. These nodes tend to be smaller than spokesman nodes and typically only communicate using wireless protocols that require very little power, such as ZigBee, 6LoWPAN, etc.

In some embodiments, some low-power nodes are incapable of bidirectional communication. These low-power nodes send messages, but they are unable to "listen." Thus, other devices in the smart home environment 100, such as the spokesman nodes, cannot send information to these low-power nodes.

In some embodiments, some low-power nodes are capable of only a limited bidirectional communication. For example, other devices are able to communicate with the low-power nodes only during a certain time period.

As described, in some embodiments, the smart devices serve as low-power and spokesman nodes to create a mesh network in the smart home environment 100. In some embodiments, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some embodiments, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some embodiments, the mesh network enables the smart home provider server system 164 to regularly receive data from most or all of the smart devices in the home, make inferences based on the data, facilitate state synchronization across devices within and outside of the smart home network 202, and send commands back to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smartphone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some embodiments, a smart nightlight 170 is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, in some embodiments, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some embodiments, the smart home environment 100 includes service robots 168 that are configured to carry out, in an autonomous manner, any of a variety of household tasks.

Figure 3:
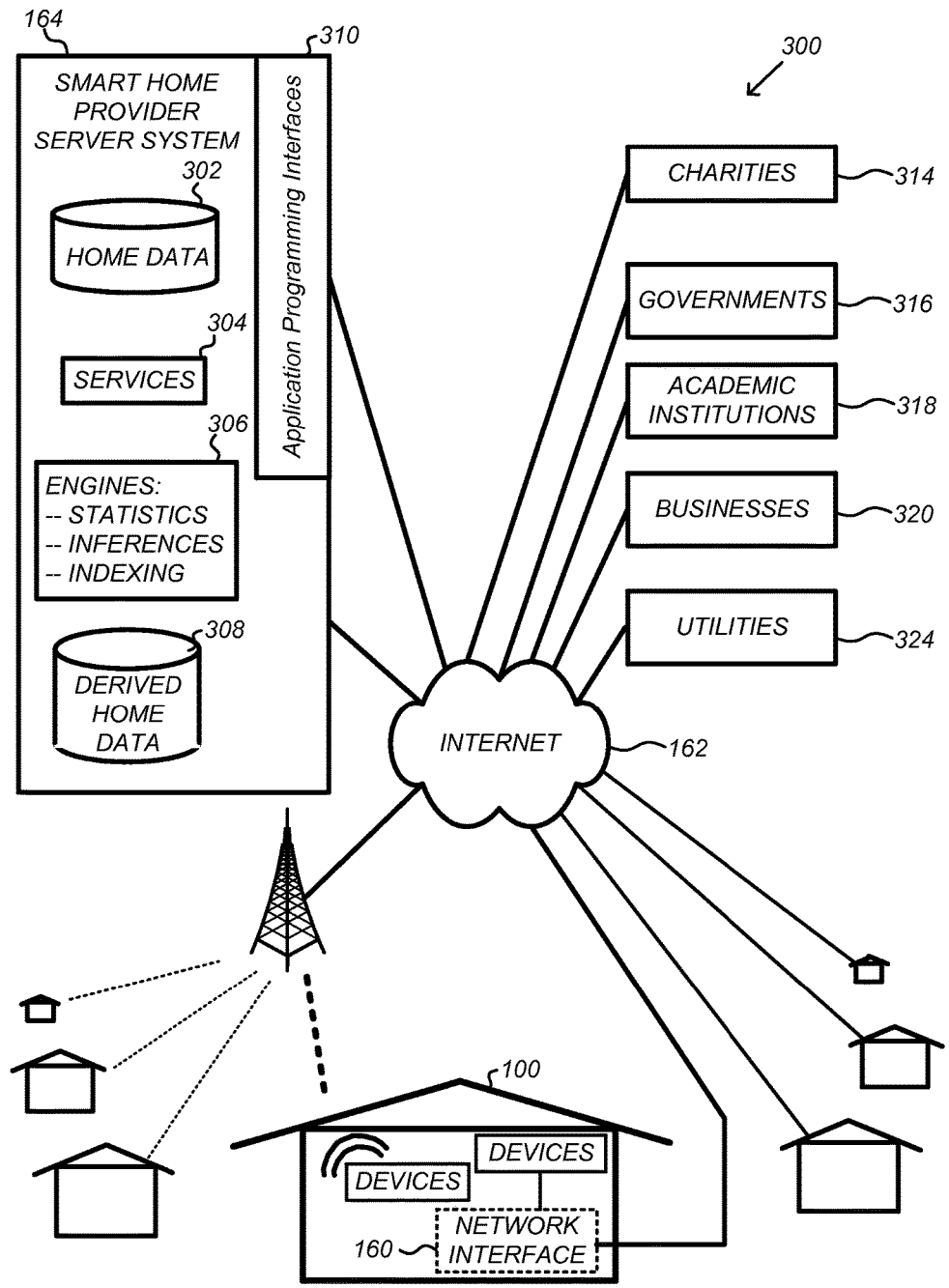
FIG. 3 illustrates a network-level view of an extensible devices and services platform with which the smart home environment of FIG. 1 is integrated, in accordance with some embodiments.

FIG. 3 illustrates a network-level view of an extensible devices and services platform with which the smart home environment of FIG. 1 is integrated, in accordance with some embodiments. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub, or an intelligent, dedicated whole-home controller node), or through any combination thereof.

In some embodiments, the devices and services platform 300 communicates with and collects data from the smart devices of smart home environment 100. In addition, in some embodiments, the devices and services platform 300 communicates with and collects data from a plurality of smart home environments across the world. For example, the smart home provider server system 164 collects home data 302 from the devices of one or more smart home environments, where the devices may routinely transmit home data or may transmit home data in specific instances (e.g., when a device queries the home data 302). Exemplary collected home data 302 includes, without limitation, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some embodiments, the smart home provider server system 164 provides one or more services 304 to smart homes and/or third parties. Exemplary services 304 include, without limitation, software updates, customer support, sensor data collection/logging, remote access, remote or distributed control, and/or use suggestions (e.g., based on collected home data 302) to improve performance, reduce utility cost, increase safety, etc. In some embodiments, data associated with the services 304 is stored at the smart home provider server system 164, and the smart home provider server system 164 retrieves and transmits the data at appropriate times (e.g., at regular intervals, upon receiving a request from a user, etc.).

In some embodiments, the extensible devices and services platform 300 includes a processing engine 306, which may be concentrated at a single server or distributed among several different computing entities without limitation. In some embodiments, the processing engine 306 includes engines configured to receive data from the devices of smart home environments (e.g., via the Internet and/or a network interface), to index the data, to analyze the data and/or to generate statistics based on the analysis or as part of the analysis. In some embodiments, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some embodiments, use statistics, use statistics relative to use of other devices, use patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some embodiments, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some embodiments, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
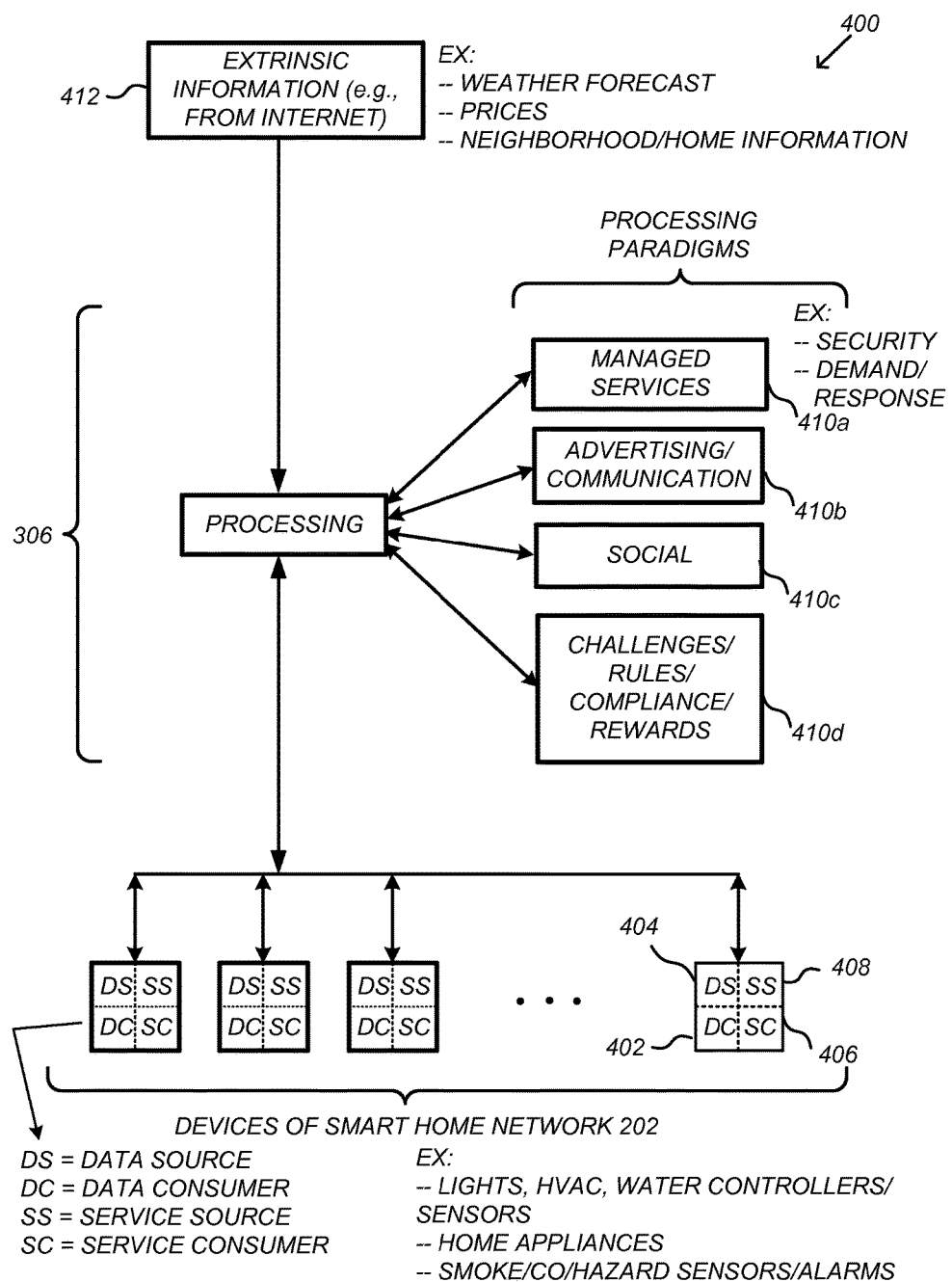
FIG. 4 illustrates an abstracted functional view of the extensible devices and services platform of FIG. 3, with reference to a processing engine as well as devices of the smart home environment, in accordance with some embodiments.

FIG. 4 illustrates an abstracted functional view 400 of the extensible devices and services platform 300 of FIG. 3, with reference to a processing engine 306 as well as devices of the smart home environment, in accordance with some embodiments. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some embodiments, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, and/or alerting a user of a current or predicted future event or characteristic. In some embodiments, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some embodiments, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some embodiments, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some embodiments, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

FIG. 5 is a block diagram illustrating an exemplary electronic device 166 in accordance with some embodiments. In some embodiments, the electronic device 166 is a mobile device (e.g., a mobile phone). In some embodiments, the electronic device 166 is a stationary device (e.g., a home entry access control system, such as the smart doorbell 106, and/or a camera 118, FIG. 1).

The electronic device 166 typically includes one or more processing units (processors or cores) 502, one or more network or other communications interfaces 504, memory 506, and one or more communication buses 508 for interconnecting these components. The communication buses 508 optionally include circuitry (sometimes called a chipset) that interconnects and controls communications between system components.

In some embodiments, the electronic device 166 includes a user interface 510. The user interface 510 includes a touch-sensitive surface 514. The user interface 510 typically includes a display device 512. In some embodiments, the device 166 includes inputs such as a keyboard, mouse, and/or other input buttons 516. In some embodiments, the device 166 includes a 3D gesture sensor for touchless gesture control. In some embodiments, the display device 512 includes the touch-sensitive surface 514, in which case the display device 512 is a touch-sensitive display. In electronic devices that have a touch-sensitive display 512, a physical keyboard is optional (e.g., a soft keyboard may be displayed when keyboard entry is needed). In some embodiments, the touch-sensitive surface 514 is located independent of the display 512 (e.g., the touch-sensitive surface 514 is separate from the display 512 or the device does not include the display 512). In some embodiments, the touch-sensitive surface 514 is configured to detect a touch on a sensing area of the touch-sensitive surface 514.

The touch-sensitive surface 514 is configured to detect an object (e.g., a conductive object) located near the sensing area of the touch-sensitive surface. For example, the touch-sensitive surface 514 is configured to detect an object located less than 0.4 mm from the sensing area. In some cases, the touch-sensitive surface 514 is capable of detecting an object located more than 0.4 mm. An exemplary touch-sensitive surface includes a capacitance sensor (e.g., a projected capacitance sensor) or a grid of capacitance sensors. In some embodiments, the touch-sensitive surface 514 includes a two-dimensional capacitance sensing area. In some embodiments, the two-dimensional capacitance sensing area includes the grid of capacitance sensors. This allows the touch-sensitive surface to detect changes in capacitance at a plurality of different locations of the two-dimensional capacitance sensing area. Typically, the touch-sensitive surface 514 is capable of detecting a location (e.g., represented as X-Y coordinates) of an object or a distribution of objects on or near the two-dimensional capacitance sensing area. In some embodiments, the two-dimensional capacitance sensing area is capable of detecting a three-dimensional position of an object on or near the two-dimensional capacitance sensing area. For example, the touch-sensitive surface 514 is capable of detecting X-Y coordinates of an object placed near the two-dimensional sensing area and a distance between the object and the touch-sensitive surface 514 (or the two-dimensional capacitance sensing area of the touch-sensitive surface 514).

Optionally, the user interface 510 also includes an audio output device 518, such as speakers or an audio output connection connected to speakers, earphones, or headphones. Furthermore, some electronic devices 166 use a microphone and voice recognition to supplement or replace the keyboard. Optionally, the electronic device 166 includes an audio input device 520 (e.g., a microphone) to capture audio (e.g., speech from a user). Optionally, the client device 166 includes a location detection device 522, such as a GPS (Global Positioning Satellite), BLE (Bluetooth Low Energy), or other geo-location receiver, for determining the location of the client device 166. The electronic device 166 also optionally includes an image/video capture device 524, such as a camera or webcam. In some embodiments, the image/video capture device 524 is used as a barcode reader.

In some embodiments, the image/video capture device 524 includes one or more other types of barcode readers (e.g., a pen-type reader, a laser scanner, a charge-coupled device (CCD) reader, an omni-directional barcode scanner, etc.).

Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the processor(s) 502. Memory 506, or alternately the non-volatile memory device(s) within memory 506, includes a non-transitory computer readable storage medium. In some embodiments, memory 506 or the computer readable storage medium of memory 506 stores the following programs, modules and data structures, or a subset or superset thereof:

- an operating system 526 that includes procedures for handling various basic system services and for performing hardware dependent tasks;
- a network communication module 528 that is used for connecting the electronic device 166 to other computers (e.g., other electronic devices and/or the smart home controller 600, FIG. 6) via the one or more communication network interfaces 504 (wired or wireless) and one or more communication networks, such as smart home network 202 (e.g., a mesh network), the Internet, cellular telephone networks, mobile data networks, other wide area networks, local area networks, metropolitan area networks, and so on;
- an image/video capture module 530 (e.g., a camera module) for processing a respective image or video captured by the image/video capture device 524, where the respective image or video may be sent or streamed (e.g., by a client application module 536) to the smart home network 202, the smart-home controller 600, and/or smart home provider server system 164;
- an audio input module 532 (e.g., a microphone module) for processing audio captured by the audio input device 520, where the respective audio may be sent or streamed (e.g., by a client application module 536) to the smart home network 202, the smart home controller 600, and/or smart home provider server system 164;
- a location detection module 534 (e.g., a GPS, Wi-Fi, or hybrid positioning module) for determining the location of the electronic device 166 (e.g., using the location detection device 522) and providing this location information to the smart home network 202, the smart home controller 600, and/or smart home provider server system 164;
- one or more application modules 536, including the following modules (or sets of instructions), or a subset or superset thereof:
  - a smart home module 538 for providing an interface to a smart home application (e.g., a stand-alone application or an application in communication with another device in smart home network 202 and/or smart home provider server system 164) and related features; and/or
  - a capacitance distribution monitoring module 540 for monitoring the touch-sensitive surface 514 (e.g., monitoring the two-dimensional capacitance sensing area of the touch-sensitive surface 514) for changes in capacitance at a plurality of different locations of the touch-sensitive surface 514 (e.g., at a plurality of different locations of the two-dimensional capacitance sensing area of the touch-sensitive surface 514); and
- one or more databases, such as:
  - capacitance distribution database 550 that stores one or more predefined capacitance distributions (e.g., capacitance barcode patterns); and
  - visual pattern database 552 that stores one or more visual patterns (e.g., optical barcode patterns).

In some embodiments, the capacitance distribution monitoring module 540 includes the following programs, modules and data structures, or a subset or superset thereof:

- a database interface 542 for interfacing with (e.g., retrieving data from and/or writing data to) one or more databases, such as a capacitance distribution database 550 and a visual pattern database 552;
- a capacitance distribution analysis module 544 for analyzing a detected capacitance distribution, such as matching a detected capacitance distribution with a capacitance distribution stored in the capacitance distribution database 550 and/or decoding the detected capacitance distribution (e.g., extracting characters stored in a conductive barcode);
- a smart home controller interface 546 for interfacing with a smart home controller (e.g., the smart home controller 600, FIG. 6), such as preparing data and/or instructions to be sent to the smart home controller; and
- a visual pattern analysis module 548 for analyzing a visual pattern detected using the image/video capture device 524, such as matching the detected visual pattern with a visual pattern stored in the visual pattern database 552 and/or decoding the visual pattern (e.g., extracting characters stored in an optical barcode).

FIG. 6 is a block diagram illustrating an exemplary smart home controller 600 in accordance with some embodiments. In some embodiments, the smart home controller 600 is one of smart devices (e.g., one of devices 102, 104, 106, 108, 110, 112, 114, 116 and/or 118, FIG. 1). In some embodiments, the smart home controller 600 is a stand-alone controller that is distinct from the smart devices and the smart home provider server system 164. In some embodiments, the smart home controller 600 is a collection of multiple smart home devices.

The smart home controller 600 typically includes one or more processing units (processors or cores) 602, one or more network or other communications interfaces 604, memory 606, and one or more communication buses 608 for interconnecting these components. The communication buses 608 optionally include circuitry (sometimes called a chipset) that interconnects and controls communications between system components.

In some embodiments, the smart home controller 600 includes a user interface 636, which typically includes an input device and/or an output device (e.g., a display, touch-sensitive surface, camera, 3D gesture sensor, keyboard, mouse, and/or input buttons). In some embodiments, the controller display includes a touch-sensitive surface, in which case the display is a touch-sensitive display (e.g., a capacitive touchscreen). In some embodiments, the smart home controller 600 receives user inputs from the electronic device 166 (FIG. 5). In some embodiments, the smart home controller 600 does not include its own display device or its own input device.

Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the processor(s) 602. Memory 606, or alternately the non-volatile memory device(s) within memory 606, includes a non-transitory computer readable storage medium. In some embodiments, memory 606 or the computer readable storage medium of memory 606 stores the following programs, modules and data structures, or a subset or superset thereof:

- an operating system 610 that includes procedures for handling various basic system services and for performing hardware dependent tasks;
- a network communication module 612 that is used for connecting the smart home controller 600 to other computers (e.g., the electronic device 166, FIG. 1) via the one or more communication network interfaces 604 (wired or wireless) and one or more communication networks, such as smart home network 202 (e.g., a mesh network), the Internet, cellular telephone networks, mobile data networks, other wide area networks, local area networks, metropolitan area networks, and so on;
- capacitance distribution database 614 that stores one or more predefined capacitance distributions (e.g., capacitance barcode patterns), such as a capacitance distribution 1 (616-1) and a capacitance distribution 2 (616-2);
- configuration database 618 that stores one or more configurations of the smart home controller (e.g., configurations of security modes and guest modes, configurations that set access levels of devices in the smart home network 202 (FIG. 2) for a respective user, and/or configurations that activate a learning module), such as a first configuration 620-1 and a second configuration 620-2;
- authentication information database 622 that stores authentication information (e.g., a user name, an identifier for an electronic device, a password, etc.); and
- a smart home controller module 624, including the following modules (or sets of instructions), or a subset or superset thereof:
  - an electronic device interface 626 for interfacing with an electronic device (e.g., the electronic device 166), such as receiving (and/or preprocessing) data and/or instructions sent from the electronic device;
  - a database interface 628 for interfacing with one or more (e.g., retrieving data from and/or writing data to) databases, such as the capacitance distribution database 614, the configuration database 618, and the authentication information database 622;
  - a capacitance distribution matching module 630 for comparing a received capacitance distribution with a capacitance distribution stored in the capacitance distribution database 614, identifying a matching capacitance distribution stored in the capacitance distribution database 614, and/or identifying a corresponding configuration 620 (e.g., the first configuration 620-1);
  - a learning module 632 for monitoring user inputs and behaviors, determining user preferences, adjusting operations of the smart home controller 600, and/or storing the adjusted operations of the smart home controller 600 in the configuration database 618; and
  - a configuration module 634 for configuring operations of the smart home controller 600 (e.g., using a pre-stored configuration in the configuration database 618), such as setting access levels of multiple devices in the smart home network 202 (FIG. 2) for a respective user and/or activating a learning module 632.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 506 and/or 606 store a subset of the modules and data structures identified above. Furthermore, memory 506 and/or 606 optionally store additional modules and data structures not described above. In some embodiments, these modules and data structures, or a subset thereof, are implemented in hardware or in a combination of hardware and software.

FIG. 7 is a flow diagram illustrating a method of configuring a smart home controller in accordance with some embodiments. In FIG. 7, configuring the smart home controller uses an electronic device 166-1, which corresponds to the electronic device 166 (FIG. 1) and a smart home controller 600. In some embodiments, configuring the smart home controller also uses a second electronic device 166-2, which has a structure analogous to the electronic device 166 (FIG. 1) but is distinct from the electronic device 166-1.

The electronic device 166-1 includes a two-dimensional capacitance sensing area (e.g., the touch-sensitive surface 514, FIG. 5) and monitors (702) the two-dimensional capacitance sensing area for changes in capacitance.

The electronic device 166-1 detects (704) a capacitance pattern on or near the two-dimensional capacitance sensing area. For example, a capacitance pattern, printed on a business card or other card using conductive ink, is placed on or near the two-dimensional capacitance sensing area.

In some embodiments, the electronic device 166-1 analyzes (706) the detected capacitance pattern. In some embodiments, the electronic device 166-1 decodes the detected capacitance pattern and identifies information (e.g., one or more instructions and/or identifying information) encoded in the detected capacitance pattern. In some embodiments, the electronic device 166-1 compares the detected capacitance pattern with a predefined capacitance pattern, and identifies one or more instructions associated with the predefined capacitance pattern.

The electronic device 166-1 initiates (708) sending information for configuring a smart home controller. In some embodiments, the sent information includes the detected capacitance pattern. In some embodiments, the sent information includes one or more instructions encoded in the detected capacitance pattern. In some embodiments, the electronic device 166-1 sends the information directly to the smart home controller 600. In some embodiments, the electronic device 166-1 sends the information to the smart home controller 600 via the second electronic device 166-2. In some embodiments, when the electronic device 166-1 sends the information to the second electronic device 166-2, the electronic device 166-1 foregoes the analysis operation 706.

Subsequent to the electronic device 166-1 sending the information to the second electronic device 166-2, the second electronic device 166-2 receives (712) the information.

In some embodiments, the second electronic device 166-2 analyzes (714) the received information. In some embodiments, the received information includes the detected capacitance pattern, and the second electronic device 166-2 decodes the detected capacitance pattern and identifies one or more instructions encoded in the detected capacitance pattern. In some embodiments, the second electronic device 166-2 compares the detected capacitance pattern with a predefined capacitance pattern, and identifies one or more instructions associated with the predefined capacitance pattern.

The second electronic device 166-2 sends (716) to the smart home controller 600 one or more instructions for configuring the smart home controller 600.

Subsequent to receiving information or instructions for configuring the smart home controller 600 from the electronic device 166-1 or the second electronic device 166-2, the smart home controller 600 configures itself in accordance with the information or instructions. In some embodiments, the smart home controller 600 changes from operating in a first configuration to operating in a second configuration that is distinct from the first configuration (e.g., in response to an instruction to operate in the second configuration).

In some embodiments, the one or more instructions sent to the smart home controller 600 include one or more instructions to operate in a particular configuration (e.g., the second configuration). In some embodiments, the one or more instructions sent to the smart home controller 600 include information identifying a user of the electronic device 166-1 or an access level of the user, and the smart home controller 600 identifies a configuration corresponding to the user or the access level of the user and switches to the identified configuration (e.g., the controller 600 initiates operation in the identified configuration).

FIGS. 8A-8C are flow diagrams illustrating a method 800 of sending information to configure a smart home controller (e.g., the smart home controller 600, FIG. 6) using a predefined capacitance distribution detected at an electronic device (e.g., electronic device 166) in accordance with some embodiments. FIGS. 8A-8C correspond to instructions stored in a computer memory or computer readable storage medium (e.g., memory 506).

Because the smart home controller is configured via a predefined capacitance distribution, the method 800 eliminates the need for providing manual inputs (e.g., typing in security codes) for configuring the smart home controller, which is more efficient, convenient, and reliable. In addition, many portable electronic devices include two-dimensional capacitance sensing areas, which eliminates the need for a separate detector for detecting the predefined capacitance distribution.

The method 800 is performed by an electronic device that includes a two-dimensional capacitance sensing area, one or more processors and memory. The electronic device monitors (802) the two-dimensional capacitance sensing area for changes in capacitance at a plurality of different locations of the two-dimensional capacitance sensing area. For example, the electronic device scans the two-dimensional capacitance sensing area at a predetermined time interval (e.g., once every second) or when prompted (e.g., by activation of a button or a user interface element on the electronic device, etc.) to detect changes in capacitance at the plurality of different locations of the two-dimensional capacitance sensing area.

In some embodiments, the electronic device is (804) a portable phone, a portable tablet, or a portable wearable electronic device with a capacitive touch-sensitive surface. For example, the electronic device is a mobile phone with a touch-sensitive screen.

In some embodiments, the electronic device is (806) a control panel coupled with the smart home controller. For example, the electronic device is a stationary device, such a smart doorbell 106 (FIG. 1) or a smart thermostat 102 (FIG. 1). In some embodiments, the electronic device is a stand-alone detector that is not integrated with any home device.

The electronic device detects (808) a predefined capacitance distribution of an object that is placed on or near the monitored two-dimensional capacitance sensing area. The object with one or more patterns of a conductive material has a respective capacitance distribution when the object is placed on or near the two-dimensional capacitance sensing area. The electronic device detects the respective capacitance distribution of the object using the two-dimensional capacitance sensing area when the object is placed on or near the two-dimensional capacitance sensing area.

In some embodiments, the predefined capacitance distribution of the object is provided (810) by conductive ink printed on the object. For example, the predefined capacitance distribution is a one-dimensional pattern (e.g., a barcode represented by parallel lines) or a two-dimensional pattern of conductive ink printed on the object, such as a linear barcode (e.g., Universal Product Code (UPC)) or a matrix barcode (e.g., Aztec Code, Data Matrix code, Maxi-Code, Quick Response (QR) code, etc.).

In some embodiments, the object also includes (812) a one-dimensional barcode or a two-dimensional barcode (e.g., an optical barcode represented by parallel lines, QR code, etc.). In some embodiments, the one-dimensional barcode or the two-dimensional barcode is optically readable. For example, the object has both the predefined capacitance distribution provided by the conductive ink (which may or may not be visible) and a visible one-dimensional barcode or a visible two-dimensional barcode.

In some embodiments, the conductive ink is printed (814) as at least part of a one-dimensional barcode or a two-dimensional barcode on the object. For example, at least a portion of an optical barcode has a shape of the predefined capacitance distribution. This allows configuring the smart home controller by either detecting the predefined capacitance distribution of the object that is placed on or near the two-dimensional capacitance sensing area (which is simpler for users, particularly those who are not familiar with photographing such codes) or taking a picture of the barcode or QR code (for users who prefer the conventional method of photographing such codes).

In some embodiments, the object is (816) a card (e.g., a paper or plastic card). For example, the card is a business card, an identification card, or an access card.

In some embodiments, the object is (818) an article of clothing (e.g., a cap, hat, shirt, glove, arm band, or other piece of clothing that can be pressed against the two-dimensional capacitance sensing area).

The electronic device, in response to detecting the predefined capacitance distribution of the object that is placed on or near the two-dimensional capacitance sensing area, initiates (820, FIG. 8B) sending information for configuring a smart home controller such that the smart home controller changes from operating in a first configuration to operating in a second configuration, distinct from the first configuration, based on the sent information. In some embodiments, the electronic device sends the information directly to the smart home controller. In some embodiments, the electronic device sends the information through a proxy (e.g., the second electronic device 166-2, FIG. 7).

In some embodiments, the electronic device, in response to detecting the predefined capacitance distribution of the object that is placed on or near the two-dimensional capacitance sensing area, initiates (822) pairing of the electronic device with the smart home controller. In some embodiments, the electronic device is not paired with the smart home controller prior to the detecting the predefined capacitance distribution, and, only after detecting the predefined capacitance distribution, the electronic device initiates pairing with the smart home controller. In some embodiments, information encoded in the predefined capacitance distribution includes information for pairing with the smart home controller (e.g., an access code) and the electronic device uses the information encoded in the predefined capacitance distribution in pairing with the smart home controller.

In some embodiments, the sent information comprises (824) one or more of: raw data from the two-dimensional capacitance sensing area and specific instructions derived from the raw data. In some embodiments, the sent information includes the predefined capacitance distribution of the object. In some embodiments, the sent information includes instructions decoded from the predefined capacitance distribution.

In some embodiments, the first configuration is (826) for a security mode of the smart home controller (e.g., a system armed mode, an owners away mode, or an owners asleep mode). In some embodiments, the smart home controller is operating in the security mode prior to detecting the predefined capacitance distribution. In some embodiments, while operating in the security mode, the smart home controller triggers an alarm in response to detecting an intrusion into, or a presence of a person in, the structure 150 (FIG. 1) and/or its vicinity. In some embodiments, while operating in the security mode, the smart home controller maintains all doors in a locked condition.

In some embodiments, the second configuration is (828) for a guest mode of the smart home controller (also called herein a nanny mode). The guest mode is configured to provide limited access to the home and/or to provide limited controls of the smart home controller. In some embodiments, while operating in the guest mode, the smart host controller maintains some of the doors unlocked (e.g., the door to a guest room) and some of the doors locked (e.g., the door to a master bedroom). In some embodiments, while operating in the guest mode, the smart home controller is prevented from triggering an alarm in response to detecting a presence of a person in the structure 150 (FIG. 1) and/or its vicinity.

In some embodiments, inputs received from users while the smart home controller is operating in the second configuration are prevented (830) from adjusting operation of the smart home controller in other configurations besides the second configuration. In some embodiments, while the smart home controller is operating in a third configuration for an owner-at-home mode (which is distinct from the first configuration and the second configuration), the smart home controller is configured to adjust operations of the smart home controller based on user inputs and/or monitored user behaviors detected while the smart home controller is operating in the third configuration. For example, the smart home controller determines that the user has turned off all of the lights in the house no later than 10 pm for over a predefined number of days, and automatically turns off all of the lights in the house by 11 pm if some lights in the house have not been turned off by the user and there is no user activity in the house (e.g., the user is sleeping). In comparison, the smart home controller does not use inputs detected while the smart home controller is operating in the second configuration to adjust smart home controller operations in the third configuration. For example, that a guest stays up past 10:00 pm with lights on while the smart home controller is operating in the guest mode does not change when the smart home controller turns off lights while the smart home controller is operating in the owner-at-home mode. This ensures that the operation of the smart home controller is not adjusted based on behaviors of non-primary users (e.g., guests).

In some embodiments, while the smart home controller is operating in the first configuration, the smart home controller executes (832) one or more learning algorithms, and while operating in the second configuration, the smart home controller is prevented from executing the one or more learning algorithms. In some embodiments, the first configuration is for the owner-at-home mode, and the second configuration is for the guest mode. While the smart home controller is operating in the owner-at-home mode, the smart home controller executes one or more learning algorithms (e.g., monitoring when the lights are typically turned off every night over a period of time to determine an automatic lights-off time). While the smart home controller is operating in the guest mode, the smart home controller does not use the one or more learning algorithms.

In some embodiments, the smart home controller executes the one or more learning algorithms while the smart home controller is operating in the guest mode. This allows the smart home controller to accommodate the behaviors of a guest (e.g., a long-term guest). In some embodiments, the smart home controller maintains a guest configuration for a respective guest separate from an owner configuration for a primary user or a group of primary users (e.g., owners).

In some embodiments, the electronic device compares (834, FIG. 8C) the detected predefined capacitance distribution to a plurality of pre-stored capacitance distributions each associated with a smart home configuration. In some embodiments, the plurality of pre-stored capacitance distributions includes a first capacitance distribution for a primary user (e.g., an owner) and a second capacitance distribution for a guest. In some embodiments, the plurality of pre-stored capacitance distributions includes different capacitance distributions for each user. The electronic device determines whether the detected predefined capacitance distribution matches one of the plurality of pre-stored capacitance distributions. For example, the electronic device determines that the detected capacitance distribution matches the second capacitance distribution for a guest. The electronic device, in accordance with a determination that the detected predefined capacitance distribution matches one of the plurality of pre-stored capacitance distributions, initiates sending one or more instructions to the smart home controller to operate in a configuration associated with the detected predefined capacitance distribution. For example, in accordance with a determination that the detected capacitance distribution matches the second capacitance distribution for a guest, the electronic device sends instructions to the smart home controller to operate in a guest mode.

In some embodiments, a second electronic device (e.g., the second electronic device 166-2, FIG. 6) that is distinct from the electronic device is in wireless communication with the electronic device. The electronic device sends (836) raw data from the electronic device to the second electronic device. The raw data includes the predefined capacitance distribution detected by the two-dimensional capacitance sensing area of the electronic device. For example, the electronic device sends the detected capacitance distribution to the second electronic device, and the second electronic device receives the detected capacitance distribution. The second electronic device compares the detected predefined capacitance distribution to a plurality of pre-stored capacitance distributions each associated with a smart home configuration. For example, the second electronic device compares the detected capacitance distribution to the first capacitance distribution for a primary user and the second capacitance distribution for a guest. The second electronic device determines whether the detected predefined capacitance distribution matches one of the plurality of pre-stored capacitance distributions; and, in accordance with a determination that the detected predefined capacitance distribution matches one of the plurality of pre-stored capacitance distributions, sends an instruction to the smart home controller to operate in a configuration associated with the detected predefined capacitance distribution. For example, in accordance with a determination that the detected capacitance distribution matches the second capacitance distribution for a guest, the second electronic device sends instructions to the smart home controller to operate in a guest mode.

Some of the features described above with respect to the method 800 are applicable to FIGS. 9A-9B in an analogous manner. Similarly, some of the features described below with respect to FIGS. 9A-9B are applicable to the method 800 in an analogous manner. For brevity, such details are not repeated herein.

FIGS. 9A-9B are flow diagrams illustrating a method 900 of configuring a smart home controller in accordance with some embodiments. FIGS. 9A-9B correspond to instructions stored in a computer memory or computer readable storage medium (e.g., memory 606).

Because the smart home controller is configured by using a predefined capacitance distribution, the method 900 eliminates the need for providing manual inputs (e.g., typing in security codes) for configuring the smart home controller, which is more efficient, convenient, and reliable.

The method 900 is performed by a smart home controller (e.g., smart home controller 600, FIG. 600) with one or more processors and memory. In some embodiments, the smart home controller is one of the smart devices illustrated in FIG. 1. In some embodiments, the smart home controller is a stand-alone controller that is distinct from the smart devices. In some embodiments, the smart home controller is a collection of multiple smart home devices.

The smart home controller receives (902) information from an electronic device with a two-dimensional capacitance sensing area. The received information is based on a predefined capacitance distribution detected for an object placed on or near the two-dimensional capacitance sensing area. For example, the smart home controller receives from the electronic device (e.g., a mobile phone) a capacitance distribution detected by the electronic device.

In some embodiments, the electronic device is (904) a portable phone, a portable tablet, or a portable wearable electronic device with a capacitive touch-sensitive surface. For example, the electronic device is a mobile phone, a watch, or glasses with a capacitive touch-sensitive surface.

In some embodiments, the electronic device is (906) a control panel coupled with the smart home controller. For example, the electronic device is a control panel for a smart doorbell 106 (FIG. 1) or a smart thermostat 102 (FIG. 1).

In some embodiments, the predefined capacitance distribution of the object is provided (908) by conductive ink printed on the object. For example, the predefined capacitance distribution is a one-dimensional pattern (e.g., a barcode represented by parallel lines) or a two-dimensional pattern of conductive ink printed on the object, such as a linear barcode (e.g., Universal Product Code (UPC)) or a matrix barcode (e.g., Aztec Code, Data Matrix code, MaxiCode, QR code, etc.).

In some embodiments, the object also includes (910) a one-dimensional barcode or a two-dimensional barcode. In some embodiments, the one-dimensional barcode or the two-dimensional barcode is optically readable. For example, the object has both the predefined capacitance distribution provided by the conductive ink (which may or may not be visible) and a visible one-dimensional barcode or a visible two-dimensional barcode.

In some embodiments, the conductive ink is printed (912) as at least part of a one-dimensional barcode or a two-dimensional barcode on the object. For example, the conductive ink is printed only on a portion, but not all, of the one-dimensional barcode or the two-dimensional barcode on the object.

In some embodiments, the received information includes (914) one or more of: raw data from the two-dimensional capacitance sensing area of the electronic device and specific instructions derived from the raw data.

The smart home controller, in response to receiving the information from the electronic device with the two-dimensional capacitance sensing area, at least conditionally configures (916) the smart home controller, such that the smart home controller changes from operating in a first configuration to operating in a second configuration, distinct from the first configuration, based on the received information. For example, in response to receiving an instruction to operate in a guest mode, the smart home controller configures itself to operate in the guest mode. As used herein, at least conditionally configuring the smart home controller includes one or more of: unconditionally configuring the smart home controller and conditionally configuring the smart home controller. In some embodiments, the smart home controller configures the smart home controller in response to receiving the information from the electronic device with the two-dimensional capacitance sensing area unconditionally (without additional conditions, beyond receiving the information from the electronic device with the two-dimensional capacitance sensing area, needing to be met to configure the smart home controller). In some embodiments, the smart home controller configures the smart home controller in response to receiving the information from the electronic device with the two-dimensional capacitance sensing area conditionally (with additional conditions, beyond receiving the information from the electronic device with the two-dimensional capacitance sensing area, needing to be met to configure the smart home controller).

In some embodiments, the smart home controller processes the information from the electronic device (e.g., decodes information stored in the detected capacitance distribution and/or performs authentication) prior to configuring the smart home controller.

In some embodiments, at least conditionally configuring the smart home controller includes (918) comparing the received information to a plurality of pre-stored capacitance distributions each associated with a smart home configuration. In some embodiments, the plurality of pre-stored capacitance distributions includes a first capacitance distribution for a primary user (e.g., an owner) and a second capacitance distribution for a guest, and the electronic device determines whether the received information matches information represented by the first capacitance distribution or the second capacitance distribution. At least conditionally configuring the smart home controller also includes determining whether the detected predefined capacitance distribution matches one of the plurality of pre-stored capacitance distributions; and, in accordance with a determination that the detected predefined capacitance distribution matches one of the plurality of pre-stored capacitance distributions, changing an operating configuration of the smart home controller to a configuration associated with the predefined capacitance distribution. For example, the electronic device determines that the received information matches information represented by the second capacitance distribution, and in accordance with a determination that there is a match, initiates operation in a guest mode.

In some embodiments, at least conditionally configuring the smart home controller includes foregoing configuring the smart home controller in accordance with a determination that the information from the electronic device does not satisfy predefined information criteria. For example, in accordance with a determination that the detected predefined capacitance does not match any of the plurality of pre-stored capacitance distributions, the electronic device does not change its operating configuration. In another example, in accordance with a determination that the information (e.g., an access level of the user) from the electronic device does not satisfy a required access level to change the operating configuration, the electronic device does not change its operating configuration.

In some embodiments, the first configuration is (920) for a security mode of the smart home controller (e.g., system armed, owners away, or asleep mode). In some embodiments, the smart home controller is operating in the security mode prior to detecting the predefined capacitance distribution. In some embodiments, while operating in the security mode, the smart home controller triggers an alarm in response to detecting an intrusion into, or a presence of a person in, the structure 150 (FIG. 1) and/or its vicinity. In some embodiments, while operating in the security mode, the smart home controller maintains all doors in a locked condition.

In some embodiments, the second configuration is (922) for a guest mode of the smart home controller (also called herein a nanny mode). The guest mode is configured to provide limited access to the home and/or to provide limited controls within the smart home controller. In some embodiments, while the smart home controller is operating in the guest mode, the smart host controller maintains some of the doors unlocked (e.g., the door to a guest room) and some of the doors locked (e.g., the door to a master bedroom). In some embodiments, while the smart home controller is operating in the guest mode, the smart home controller is prevented from triggering an alarm in response to detecting a presence of a person in the structure 150 (FIG. 1) and/or its vicinity.

In some embodiments, the smart home controller prevents (924) inputs received from users while the smart home controller is operating in the second configuration from adjusting operation of the smart home controller in other configurations besides the second configuration. For example, behaviors of a guest detected while the smart home controller is operating in the guest mode are not used to adjust operation of the smart home controller in the owner-at-home mode.

In some embodiments, the smart home controller, while operating in the first configuration, executes (926) one or more learning algorithms; and, while operating in the second configuration, foregoes executing the one or more learning algorithms. For example, while the smart home controller is operating in the owner-at-home mode, the smart home controller executes one or more learning algorithms to learn the behavior of the owner, and while the smart home controller is operating in the guest mode, the smart home controller is prevented from executing the one or more learning algorithms so that the smart home controller does not learn the behavior of the guest.

FIGS. 10A-10G illustrate exemplary barcodes in accordance with some embodiments.

Figure 10A:
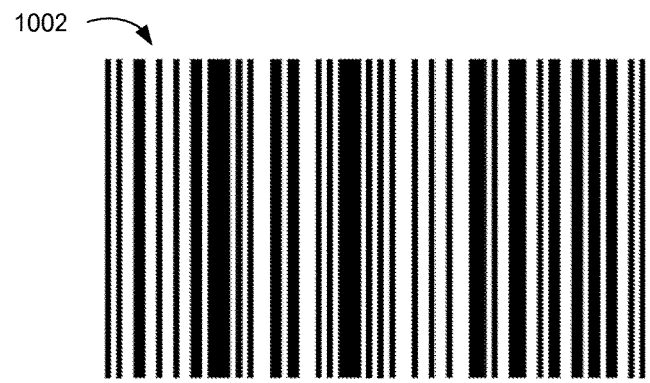
FIGS. 10A-10G illustrate exemplary barcodes in accordance with some embodiments.
Figure 11A:
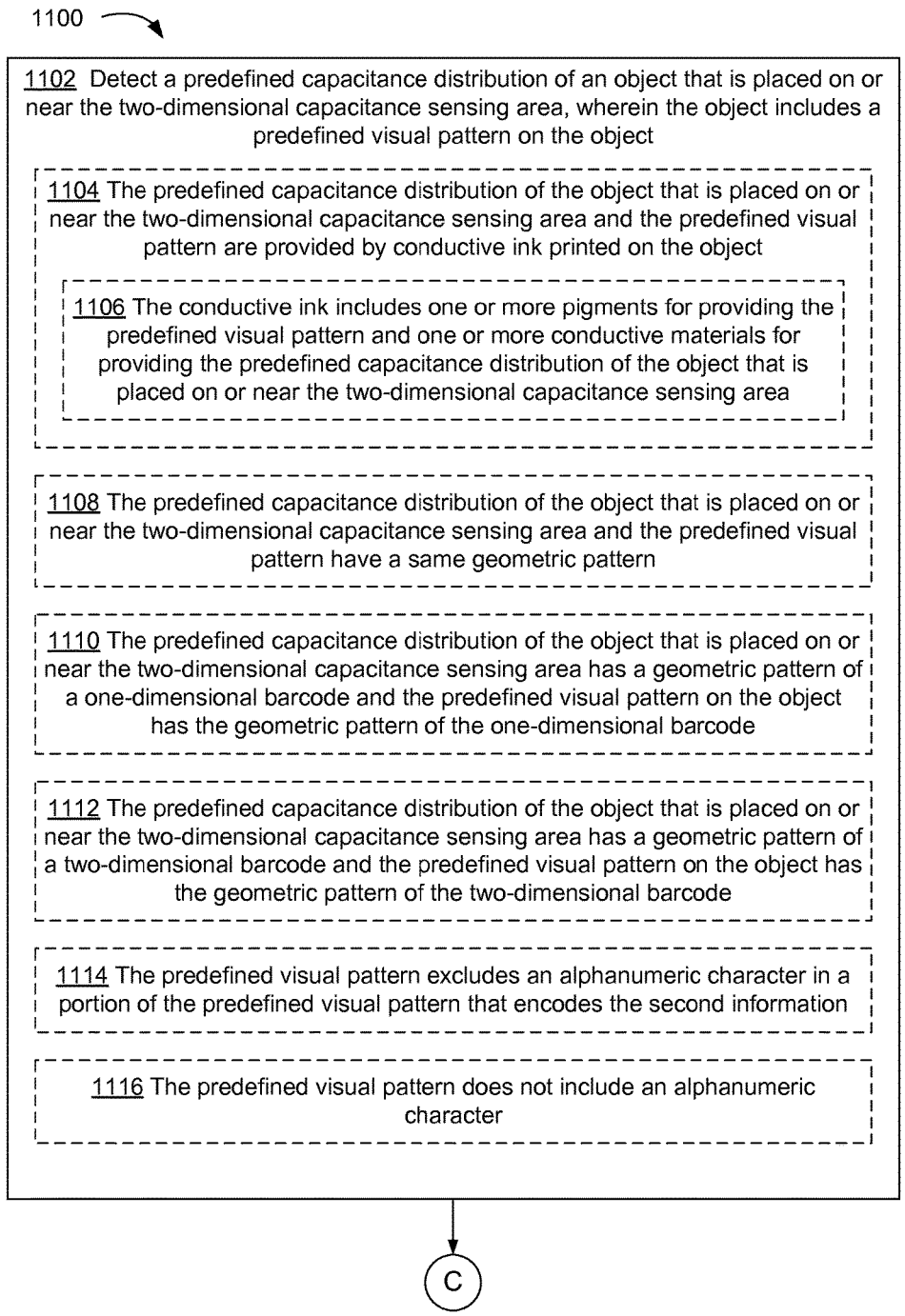
FIGS. 11A-11B are flow diagrams illustrating a method of performing a predefined operation based on detecting a predefined capacitance distribution of an object and based on detecting a predefined visual pattern of the object in accordance with some embodiments.
Figure 11B:
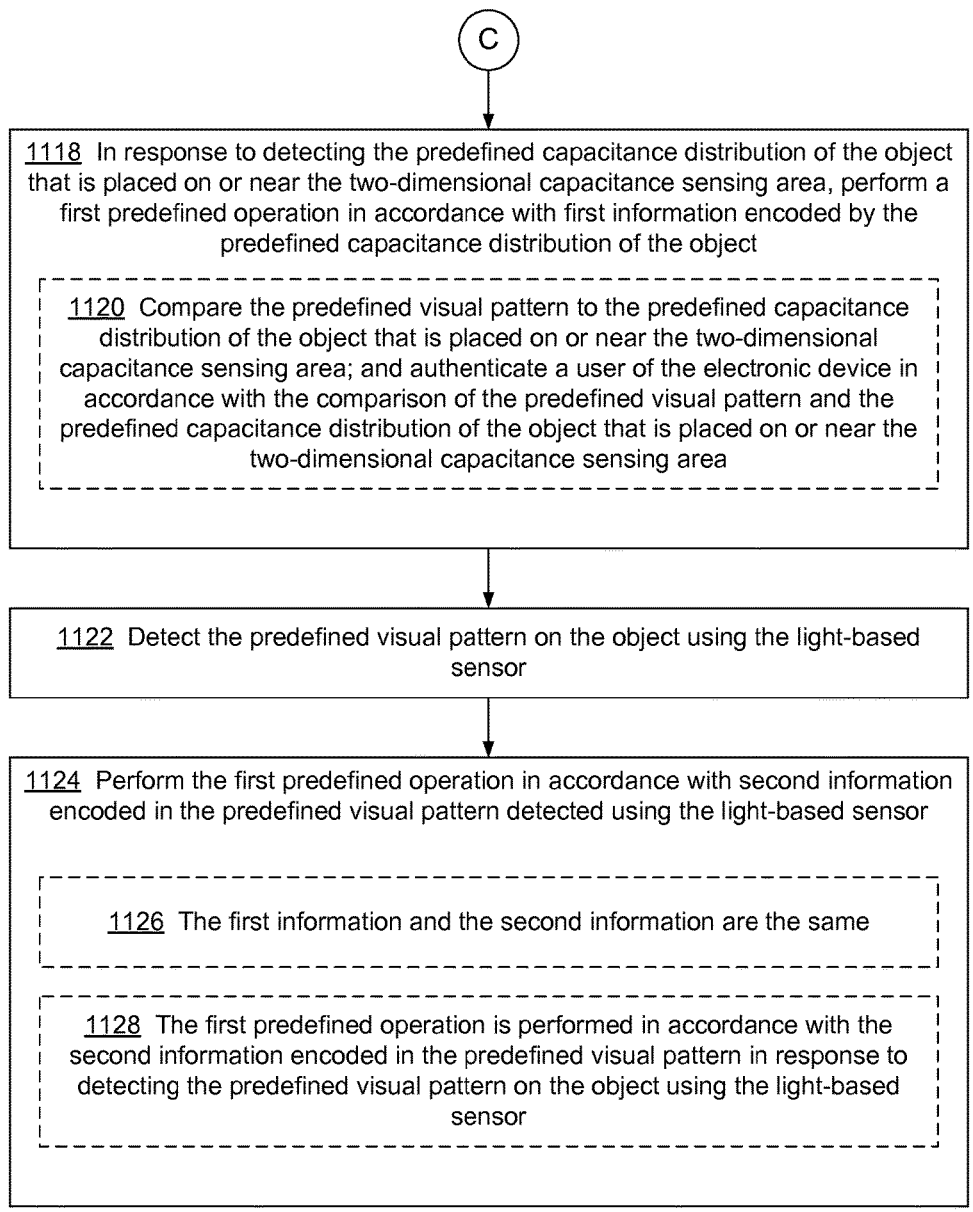

FIG. 10A illustrates a linear barcode 1002 in accordance with some embodiments. A linear barcode includes a plurality of lines (typically parallel lines). In some embodiments, information is encoded in a linear barcode at least based on one or more of: the number of lines, widths of the lines, and spaces between the lines. Exemplary linear barcodes include Universal Product Code (UPC) barcodes.

Figure 10B:
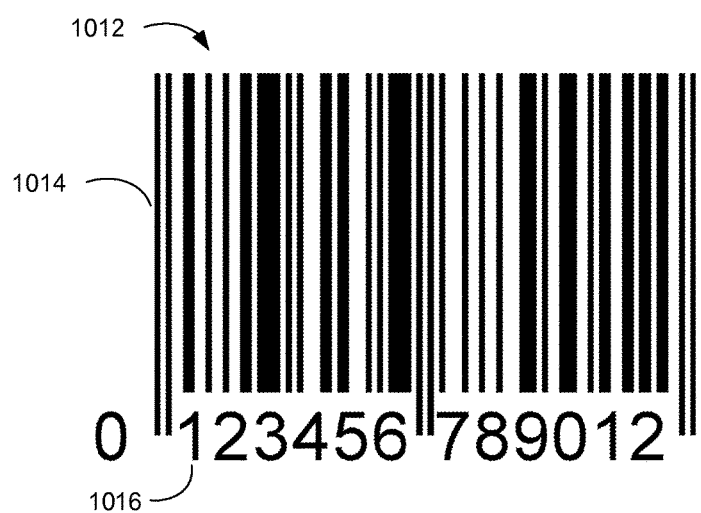

FIG. 10B illustrates a code 1012 in accordance with some embodiments. The code 1012 includes a linear barcode 1014, which is similar to the linear barcode 1002 in FIG. 10A. The code 1012 also includes numerical characters 1016 located below the linear barcode 1014.

Figure 10C:
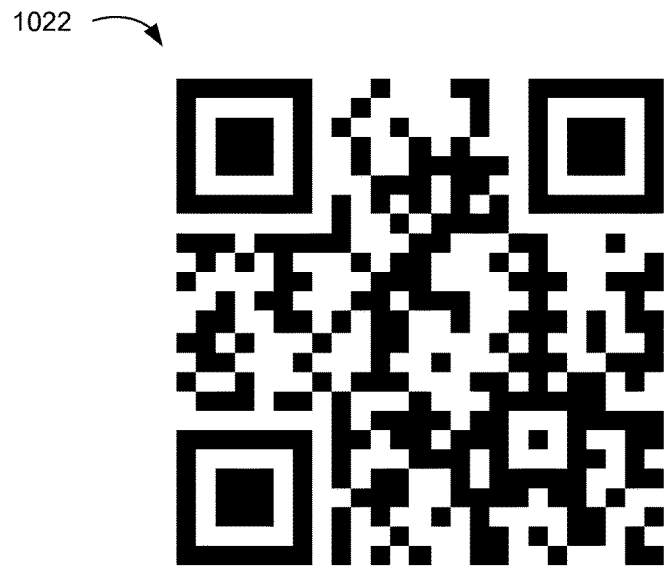

FIG. 10C illustrates a two-dimensional barcode 1022 in accordance with some embodiments. The two-dimensional barcode 1022 includes square dots arranged in a square grid. When implemented as an optical barcode, the square dots in the two-dimensional barcode 1022 have a color contrast with a background. For example, the square dots are printed in black on a white background. The two-dimensional barcode 1022 is an exemplary QR code. In some embodiments, a QR code is capable of storing up to 7,089 numeric characters or 4,296 alphanumeric characters. In some embodiments, the QR code stores a uniform resource locator (URL). The URL is used by a web browser to access a corresponding web page. In some embodiments, the QR code stores executable instructions (e.g., JavaScript codes). Similarly, other barcodes may encode information, such as a URL or executable instructions.

Figure 10D:
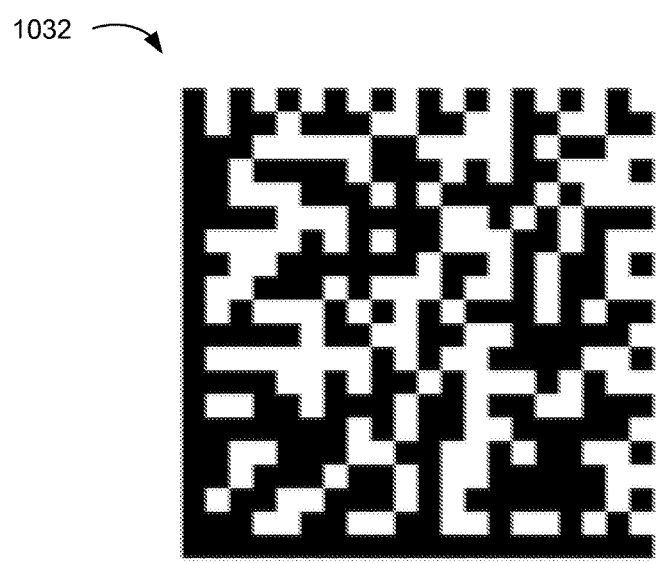

FIG. 10D illustrates a two-dimensional barcode 1032 in accordance with some embodiments. The two-dimensional barcode 1032 is an exemplary Data Matrix code. In some embodiments, a Data Matrix code is capable of storing up to 2,335 alphanumeric characters. The two-dimensional barcode 1032 includes square dots arranged in a square or rectangular grid.

The barcodes illustrated in FIGS. 10A-10D may be implemented as an optical barcode, a capacitance distribution (also called herein a conductive barcode), or both. In some embodiments, a barcode is printed in non-conductive ink on the surface of an object (e.g., access cards, business cards, data cards, catalog, clothing, identification tags, tickets, labels, product packaging, and/or products), woven in non-conductive ink into an object (e.g., clothing such as hats, shirts, wrist bands, and/or gloves) or otherwise applied to or integrated with the surface of an object. In some embodiments, a barcode is printed in conductive ink on the surface of the object, woven in conductive ink into the object, or otherwise applied to or integrated with the surface of an object. For example, the barcodes illustrated in FIG. 10A-10D, when printed using ink that includes a pigment (e.g., a black ink), serve as optical barcodes, which are configured for detection with a light-based sensor. Alternatively, the barcodes, when printed using conductive ink (e.g., ink that includes conductive material, such as silver particles), serve as conductive barcodes, which are configured for detection with a capacitance sensor (e.g., a two-dimensional capacitance sensing area). In some embodiments, conductive ink is not optically readable (e.g., invisible to a light-based sensor). In some embodiments, the barcodes, when printed using conductive ink that includes a pigment, serve as both optical barcodes and conductive barcodes. Such barcodes are configured for detection with either a light-based sensor or a capacitance sensor. In such embodiments, the optical barcode and the conductive barcode have a same geometric pattern (e.g., the shape of the optical barcode and the shape of the conductive barcode are identical).

Figure 10E:
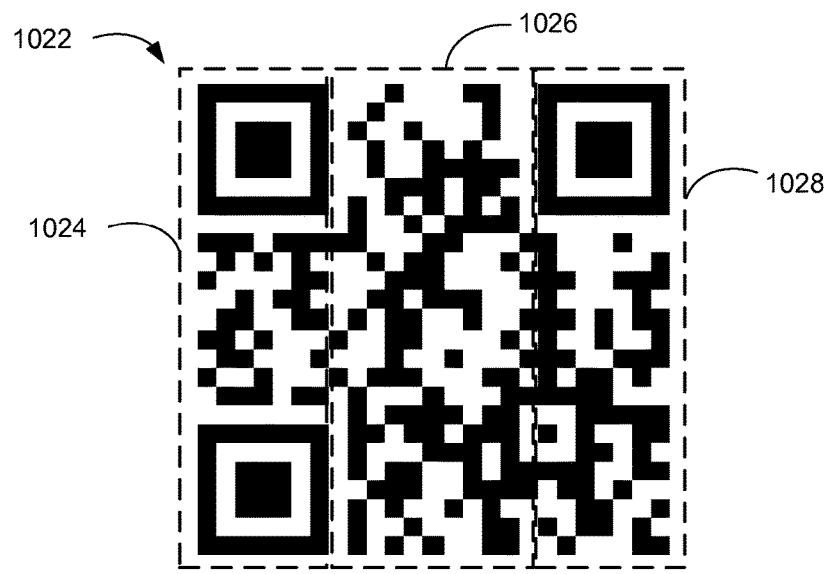
Figure 10F:
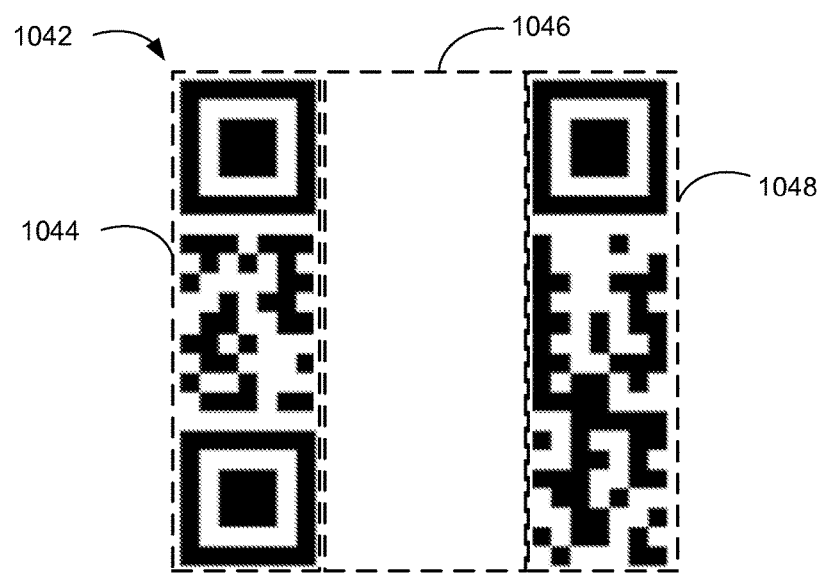
Figure 10G:
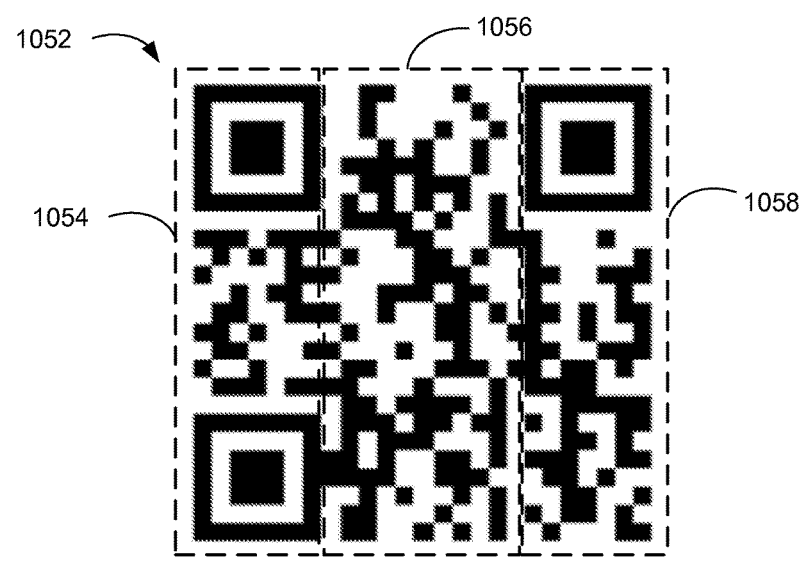

FIGS. 10E-10G are used below to describe an exemplary set of an optical barcode and a conductive barcode, in which the optical barcode and the conductive barcode do not have a same geometric pattern. The set of the optical barcode and the conductive barcode offers a way for conveying information at a higher information density with higher reliability and better security. For example, in some embodiments, the optical barcode in the form of a QR code stores a first set of 7,089 numeric characters and the conductive barcode in the form of a QR code stores a second set of 7,089 numeric characters. Thus, the set of the optical barcode and the conductive barcode can store twice as many numeric characters as a single QR code used alone. In some embodiments, in a set of an optical barcode and a conductive barcode, information stored in the optical barcode is used to validate and/or authenticate information stored in the conductive barcode, or vice versa, thereby increasing the reliability and security of the set of the barcodes.

FIG. 10E illustrates segmentation of the two-dimensional barcode 1022 (also called herein a first barcode) in accordance with some embodiments. In FIG. 10E, the two-dimensional barcode 1022 is divided into three segments: left segment 1024, middle segment 1026, and right segment 1028.

FIG. 10F illustrates a two-dimensional barcode 1042 (also called herein a second barcode) in accordance with some embodiments. In some embodiments, as shown in FIG. 10F, the second barcode 1042 is a subset of the two-dimensional barcode 1022. The second barcode 1042 includes a left segment 1044, which corresponds to the left segment 1024 of the first barcode 1022, and a right segment 1048, which corresponds to the right segment 1028 of the first barcode 1022. However, the second barcode 1042 does not include features (e.g., square dots) in a middle segment 1046.

In some embodiments, the first barcode 1022 in FIG. 10E and the second barcode 1042 in FIG. 10F are printed on a same object. In some embodiments, the first barcode 1022 and the second barcode 1042 are aligned (e.g., the left segments 1024 and 1044 overlap each other and the right segments 1028 and 1048 overlap each other). In some embodiments, the first barcode 1022 and the second barcode 1042 at least partially overlap each other. In some embodiments, the first barcode 1022 and the second barcode 1042 only partially overlap each other, and do not completely overlap each other. In some embodiments, the first barcode 1022 and the second barcode 1042 do not overlap each other. In some embodiments, the first barcode 1022 and the second barcode 1042 have a same size. In some embodiments, the first barcode 1022 and the second barcode 1042 have distinct sizes.

In some embodiments, the first barcode 1022 represents an optical barcode, and the second barcode 1042 represents a conductive barcode. In some embodiments, the first barcode 1022 represents a conductive barcode, and the second barcode 1042 represents an optical barcode.

In some embodiments, the first barcode 1022 is printed on an object first, and the second barcode 1042 is printed over the first barcode 1022. For example, the first barcode 1022 is printed on the object first using conductive ink, and the second barcode 1042 is printed over the first barcode 1022 using ink that includes a pigment. Alternatively, the first barcode 1022 is printed on the object first using ink that includes a pigment, and the second barcode 1022 is printed over the first barcode 1022 using conductive ink. In some embodiments, the second barcode 1022 is printed on an object first, and the first barcode 1022 is printed over the second barcode 1022. For example, the second barcode 1022 is printed on the object first using conductive ink, and the first barcode 1022 is printed over the second barcode 1022 using ink that includes a pigment. Alternatively, the second barcode 1022 is printed on the object first using ink that includes a pigment, and the first barcode 1022 is printed over the second barcode 1022 using conductive ink.

In some embodiments, the left segments 1024 and 1044 are printed concurrently using conductive ink that includes a pigment. Similarly, the right segments 1028 and 1048 are printed concurrently using the conductive ink that includes a pigment. The middle segment 1026 is printed using either conductive ink that does not include a pigment or a non-conductive ink that includes a pigment so that the middle segment of the optical barcode and the middle segment of the conductive barcode do not match (e.g., the segments 1026 and 1046 do not match).

FIG. 10G illustrates a two-dimensional barcode 1052 in accordance with some embodiments. The two-dimensional barcode 1052 has three segments: a left segment 1054, a middle segment 1056, and a right segment 1058. The left segment 1054 corresponds to the left segment 1024 (FIG. 10E), and the right segment 1058 corresponds to the right segment 1028 (FIG. 10E). The middle segment 1056 is a mirror image of the middle segment 1026 (FIG. 10E).

In some embodiments, a set of the barcode 1022 and the barcode 1052 is used for authentication (or error correction). For example, for an object that includes both the barcode 1022 (e.g., as an optical barcode) and the barcode 1026 (e.g., as a conductive barcode), an electronic device compares the middle segment 1026 of the barcode 1022 and the middle segment 1056 of the barcode 1056. In some embodiments, at least in accordance with a determination that the middle segment 1026 matches a mirror image of the middle segment 1056 (or a mirror image of the middle segment 1026 matches the middle segment 1056), the object that includes both the barcode 1022 and the barcode 1026 is deemed to be authentic.

In some embodiments, a two-dimensional barcode (not shown) has three segments: a left segment, a middle segment, and a right segment. The left segment corresponds to the left segment 1024 (FIG. 10E), and the right segment corresponds to the right segment 1028 (FIG. 10E). The middle segment is an inverse image of the middle segment 1026 (FIG. 10E).

In some embodiments, a set of an optical barcode and a conductive barcode is provided by printing conductive ink that includes a white pigment on a colored background. In such embodiments, the optical barcode is an inverse image of the conductive barcode.

Although FIGS. 10E-10G describe a set of a two-dimensional optical barcode and a two-dimensional conductive barcode, other combinations may be used. For example, a set of a two-dimensional optical barcode and a one-dimensional conductive barcode is used. Alternatively, a set of a one-dimensional optical barcode and a two-dimensional conductive barcode is used.

In accordance with some embodiments, an article of manufacture includes a substrate (e.g., a paper or plastic card, an article of clothing, or other base material that the conductive material can be applied to).

The article of manufacture also includes a conductive material (e.g., silver powders or copper wires) that is applied to or integrated within the substrate and configured to provide a predefined capacitance distribution when the article is placed on or near a two-dimensional capacitance sensing area of an electronic device. For example, the conductive material has a predefined shape (e.g., a shape of a barcode as shown in FIG. 10C). The predefined capacitance distribution of the article encodes first information (e.g., a URL).

The article further includes a predefined visual pattern that encodes second information. For example, the article is printed with an optical barcode (e.g., FIG. 10C). In some embodiments, the predefined visual pattern is located on the substrate.

In some embodiments, the predefined capacitance distribution of the article and the predefined visual pattern are provided by conductive ink printed on the substrate. For example, the conductive ink includes a pigment so that it can provide both the predefined capacitance distribution and the predefined visual pattern.

In some embodiments, the conductive ink includes one or more pigments that provide the predefined visual pattern and the conductive material that provides the predefined capacitance distribution.

In some embodiments, the conductive material is arranged in the predefined visual pattern. In some embodiments, the conductive material and the predefined visual pattern have a same geometric pattern.

In some embodiments, the conductive material has a geometric pattern of a one-dimensional barcode (e.g., FIG. 10A). In some embodiments, the predefined visual pattern also has a geometric pattern of the one-dimensional barcode. For example, both the optical barcode and the conductive barcode are both one-dimensional barcodes.

In some embodiments, the conductive material has a geometric pattern of a two-dimensional barcode. In some embodiments, the predefined visual pattern also has a geometric pattern of the two-dimensional barcode. For example, both the optical barcode and the conductive barcode are both two-dimensional barcodes.

In some embodiments, the first information and the second information are the same. For example, both the conductive material and the predefined visual pattern encode a same URL.

In some embodiments, the predefined visual pattern excludes an alphanumeric character in a portion of the predefined visual pattern that encodes the second information. For example, as shown in FIG. 10B, the code 1012 includes alphanumeric characters, but the alphanumeric characters do not overlap with the linear barcode 1014.

In some embodiments, the predefined visual pattern does not include an alphanumeric character. For example, as shown in FIG. 10A, the barcode 1002 does not include any alphanumeric character.

In some embodiments, the article is a card (e.g., a paper or plastic card). In some embodiments, the article is a grocery item, electronic item, retail boxes, etc. In some embodiments, the article is an article that typically uses a barcode or a QR code.

In some embodiments, the article is an article of clothing (e.g., a cap, hat, shirt, glove, arm band, or other piece of clothing that can be pressed against the two-dimensional capacitance sensing area).

In some embodiments, the predefined capacitance distribution of the article causes the electronic device to perform a first predefined operation in accordance the first information. For example, the predefined capacitance distribution encodes a URL, which causes the electronic device to retrieve and display a webpage that corresponds to the URL. In another example, the predefined capacitance distribution encodes a unique identifier, which causes the electronic device to send a configuration instruction to a smart home controller.

In some embodiments, the predefined visual pattern, when detected by a light-based sensor (e.g., a camera) of the electronic device, causes the electronic device to perform the first predefined operation in accordance with the second information. Thus, the first predefined operation can be performed by either placing the predefined capacitance distribution on a capacitance sensor or acquiring the predefined visual pattern using the light-based sensor. This allows a user to perform the first predefined operation using an input method that the user prefers (e.g., the capacitance sensor or the light-based sensor).

FIGS. 11A-11B are flow diagrams illustrating a method 1100 of performing a predefined operation based on detecting a predefined capacitance distribution of an object and performing the predefined operation based on detecting a predefined visual pattern of the object at an electronic device (e.g., electronic device 166) in accordance with some embodiments. FIGS. 11A-11B correspond to instructions stored in a computer memory or computer readable storage medium (e.g., memory 506).

Method 1100 performs the predefined operation by either placing the predefined capacitance distribution on a capacitance sensor or acquiring the predefined visual pattern using a light-based sensor. This allows a user to perform the predefined operation using an input method that the user prefers (e.g., the capacitance sensor or the light-based sensor).

The method 1100 is performed by an electronic device with a two-dimensional capacitance sensing area, a light-based sensor, one or more processors and memory.

Some of the features described above with respect to methods 800 and 900 are applicable to method 1100 in an analogous manner. For brevity, these details are not repeated herein.

In some embodiments, the electronic device is a portable phone, a portable tablet, or a portable wearable electronic device with a capacitive touch-sensitive surface. For example, the electronic device is a mobile phone with a touch-sensitive screen.

In some embodiments, the electronic device is a control panel coupled with the smart home controller. For example, the electronic device is a control panel coupled with a stationary device, such a smart doorbell 106 (FIG. 1) or a smart thermostat 102 (FIG. 1).

In some embodiments, the electronic device is a stand-alone detector that is not integrated with any home device.

The electronic device detects (1102) a predefined capacitance distribution of an object that is placed on or near the two-dimensional capacitance sensing area. The object includes a predefined visual pattern on the object. For example, the object has a conductive barcode and an optical barcode. In some embodiments, the predefined visual pattern is made without using ink. For example, the predefined visual pattern is made by making an indentation on the object (e.g., by making a cutout or embossing).

In some embodiments, the predefined capacitance distribution of the object that is placed on or near the two-dimensional capacitance sensing area and the predefined visual pattern are provided (1104) by conductive ink printed on the object. For example, the conductive ink has both conductivity and color so that it can be used to provide both the predefined capacitance distribution and the predefined visual pattern.

In some embodiments, the conductive ink includes (1106) one or more pigments for providing the predefined visual pattern and one or more conductive materials for providing the predefined capacitance distribution of the object that is placed on or near the two-dimensional capacitance sensing area. Exemplary pigments include metal-based pigments, such as titanium black, azurite, Prussian blue, and zinc white, inorganic pigments, such as carbon black and ultramarine, and organic pigments, such as alizarin, indigo, and magenta. Exemplary conductive materials include powdered or flaked metal (e.g., silver, copper, etc.), carbon-based conductors, and conductive polymers.

In some embodiments, the predefined capacitance distribution of the object that is placed on or near the two-dimensional capacitance sensing area and the predefined visual pattern have (1108) a same geometric pattern. For example, both the optical barcode and the conductive barcode have a shape shown in FIG. 10C.

In some embodiments, the predefined capacitance distribution of the object that is placed on or near the two-dimensional capacitance sensing area has (1110) a geometric pattern of a one-dimensional barcode and the predefined visual pattern on the object has the geometric pattern of the one-dimensional barcode. For example, both the optical barcode and the conductive barcode have a shape shown in FIG. 10A.

In some embodiments, the predefined capacitance distribution of the object that is placed on or near the two-dimensional capacitance sensing area has (1112) a geometric pattern of a two-dimensional barcode and the predefined visual pattern on the object has the geometric pattern of the two-dimensional barcode. For example, both the optical barcode and the conductive barcode have a shape shown in FIG. 10C.

In some embodiments, the predefined visual pattern excludes (1114) an alphanumeric character in a portion of the predefined visual pattern that encodes the second information. For example, the code 1012 in FIG. 10B includes numeric characters, but the numeric characters do not overlap with the barcode 1014.

In some embodiments, the predefined visual pattern does not include (1116) an alphanumeric character. For example, the barcode 1022 in FIG. 10C does not include any alphanumeric character.

In some embodiments, the predefined capacitance distribution does not include an alphanumeric character.

The electronic device, in response to detecting the predefined capacitance distribution of the object that is placed on or near the two-dimensional capacitance sensing area, performs (1118, FIG. 11B) a first predefined operation in accordance with first information encoded by the predefined capacitance distribution of the object. For example, the predefined capacitance distribution encodes a URL and the electronic device retrieves and displays a web page that corresponds to the URL. In another example, the predefined capacitance distribution encodes executable instructions (e.g., JavaScript codes), and the electronic device executes the encoded instructions. In yet another example, the predefined capacitance distribution encodes a unique identifier, and the electronic device sends out instructions for configuring a smart home controller in accordance with a determination that the unique identifier matches a pre-stored identifier (e.g., an identifier of a guest).

In some embodiments, the electronic device compares (1120) the predefined visual pattern to the predefined capacitance distribution of the object that is placed on or near the two-dimensional capacitance sensing area; and authenticates a user of the electronic device in accordance with the comparison of the predefined visual pattern and the predefined capacitance distribution of the object that is placed on or near the two-dimensional capacitance sensing area. For example, in accordance with a determination that the predefined visual pattern matches the predefined capacitance distribution of the object (e.g., the predefined visual pattern and the predefined capacitance distribution have a same geometric shape), the object is deemed to be authentic. In addition, a user who uses the electronic device when the determination that the predefined visual pattern matches the predefined capacitance distribution is deemed to be an authorized user.

The electronic device detects (1122) the predefined visual pattern on the object using the light-based sensor. For example, the electronic device scans the optical barcode on the object using the image/video capture device 524 (FIG. 5, e.g., a camera).

The electronic device performs (1124) the first predefined operation in accordance with second information encoded in the predefined visual pattern detected using the light-based sensor. For example, the information represented by the predefined capacitance distribution of the object includes a URL, and performing a predefined operation in accordance with information represented by the predefined capacitance distribution of the object includes opening a webpage that corresponds to the URL.

In some embodiments, the first information and the second information are (1126) the same. For example, the optical barcode and the conductive barcode both encode a same URL (or a same user identifier). In some embodiments, the first information is distinct from the second information.

In some embodiments, the first predefined operation is performed (1128) in accordance with the second information encoded in the predefined visual pattern in response to detecting the predefined visual pattern on the object using the light-based sensor. For example, the electronic device, in response to detecting the predefined visual pattern on the object using the light-based sensor, performs the first predefined operation in accordance with the second information encoded in the predefined visual pattern.

For situations in which the systems discussed above collect information about users, the users may be provided with an opportunity to opt in/out of programs or features that may collect personal information (e.g., information about a user's preferences or usage of a smart device). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An article of manufacture, comprising:
a substrate;
a conductive material that is applied to or integrated within the substrate and configured to provide a predefined capacitance distribution when the article is placed on or near a two-dimensional capacitance sensing area of an electronic device, the predefined capacitance distribution of the article encoding first information used by the electronic device to perform a first predefined operation in accordance with the first information; and
a predefined visual pattern that encodes second information used by the electronic device to perform a second predefined operation in accordance with the second information, wherein the first and second information convey different instructions for configuring a smart home environment.

2. The article of claim 1, wherein the predefined capacitance distribution of the article and the predefined visual pattern are provided by conductive ink printed on the substrate.

3. The article of claim 2, wherein the conductive ink includes one or more pigments that provide the predefined visual pattern and the conductive material that provides the predefined capacitance distribution.

4. The article of claim 1, wherein the conductive material is arranged in the predefined visual pattern.

5. The article of claim 1, wherein the conductive material has a geometric pattern of a one-dimensional barcode.

6. The article of claim 1, wherein the conductive material has a geometric pattern of a two-dimensional barcode.

7. The article of claim 1, wherein the first predefined operation and the second predefined operation are the same.

8. The article of claim 1, wherein the predefined visual pattern does not include an alphanumeric character.

9. The article of claim 1, wherein the article is a card.

10. The article of claim 1, wherein the article is an article of clothing.

11. An electronic device, comprising:
a two-dimensional capacitance sensing area,
a light-based sensor,
one or more processors, and
memory storing one or more programs for execution by the one or more processors, the one or more programs including instructions for:
detecting a predefined capacitance distribution of an object that is placed on or near the two-dimensional capacitance sensing area, wherein the object includes a predefined visual pattern on the object;
in response to detecting the predefined capacitance distribution of the object that is placed on or near the two-dimensional capacitance sensing area, performing a first predefined operation in accordance with first information encoded by the predefined capacitance distribution of the object;
detecting the predefined visual pattern on the object using the light-based sensor; and
performing a second predefined operation in accordance with second information encoded in the predefined visual pattern detected using the light-based sensor, wherein the first and second information convey different instructions for configuring a smart home environment.

12. The device of claim 11, wherein the first predefined operation and the second predefined operation are the same.

13. The device of claim 11, wherein performing the first predefined operation in accordance with the first information includes changing the smart home configuration from a first configuration to a second configuration distinct from the first configuration.

14. The device of claim 13, wherein the first configuration is a security mode and the second configuration is a guest mode.

15. The device of claim 11, wherein each of the first and second information identifies a user of the electronic device or a predefined access level of the user.

16. A computer readable storage medium, storing:
one or more programs, the one or more programs comprising instructions, which, when executed by an electronic device with a two-dimensional capacitance sensing area, a light-based sensor, one or more processors and memory, cause the electronic device to:
detect a predefined capacitance distribution of an object that is placed on or near a two-dimensional capacitance sensing area, wherein the object includes a predefined visual pattern on the object;
in response to detecting the predefined capacitance distribution of the object that is placed on or near the two-dimensional capacitance sensing area, perform a first predefined operation in accordance with first information encoded by the predefined capacitance distribution of the object;
detect the predefined visual pattern on the object using the light-based sensor; and
perform a second predefined operation in accordance with second information encoded in the predefined visual pattern detected using the light-based sensor, wherein the first and second information convey different instructions for configuring a smart home environment.

17. The computer readable storage medium of claim 16, wherein the predefined capacitance distribution of the object that is placed on or near the two-dimensional capacitance sensing area and the predefined visual pattern are provided by conductive ink printed on the object.

18. The computer readable storage medium of claim 16, wherein the conductive ink includes one or more pigments for providing the predefined visual pattern and one or more conductive materials for providing the predefined capacitance distribution of the object that is placed on or near the two-dimensional capacitance sensing area.

19. The computer readable storage medium of claim 16, wherein the predefined capacitance distribution of the object that is placed on or near the two-dimensional capacitance sensing area and the predefined visual pattern have a same geometric pattern.

20. The computer readable storage medium of claim 16, wherein the predefined capacitance distribution of the object that is placed on or near the two-dimensional capacitance sensing area has a geometric pattern of a one-dimensional barcode and the predefined visual pattern on the object has the geometric pattern of the one-dimensional barcode.

* * * * *